United States Patent
Burns et al.

(10) Patent No.: US 7,984,559 B2
(45) Date of Patent: Jul. 26, 2011

(54) GOLF CLUB FITTING APPARATUS AND METHOD

(75) Inventors: Kevin Burns, San Carlos, CA (US); David A. Ruigh, San Jose, CA (US); Russ Gustafson, Redwood City, CA (US)

(73) Assignee: KB Golf Manufacturing, Inc., San Jose, CA (US)

( * ) Notice: Subject to any disclaimer, the term of this patent is extended or adjusted under 35 U.S.C. 154(b) by 388 days.

(21) Appl. No.: 12/345,355

(22) Filed: Dec. 29, 2008

(65) Prior Publication Data

US 2009/0222206 A1 Sep. 3, 2009

Related U.S. Application Data

(60) Provisional application No. 61/021,624, filed on Jan. 16, 2008.

(51) Int. Cl.
*G01B 1/00* (2006.01)
*G01B 7/02* (2006.01)
*G01B 7/30* (2006.01)

(52) U.S. Cl. ......................................................... 33/508

(58) Field of Classification Search .................... 33/508, 33/534
See application file for complete search history.

(56) References Cited

U.S. PATENT DOCUMENTS

| | | | |
|---|---|---|---|
| 4,885,847 A * | 12/1989 | Korfanta | 33/508 |
| 5,469,627 A | 11/1995 | Denny et al. | |
| 5,782,005 A * | 7/1998 | Reilly, III | 33/508 |
| 5,864,960 A | 2/1999 | Denicolo et al. | |
| 6,449,860 B1 * | 9/2002 | Nakai | 33/508 |
| 6,767,282 B2 | 7/2004 | Matsuyama et al. | |
| 7,172,513 B1 * | 2/2007 | Rinker | 33/508 |
| 7,221,114 B2 | 5/2007 | Kojima | |
| 7,802,373 B1 * | 9/2010 | Diesterheft | 33/508 |
| 2002/0069133 A1 * | 6/2002 | Currie et al. | 705/26 |
| 2003/0005593 A1 * | 1/2003 | Muldoon | 33/508 |
| 2003/0136014 A1 * | 7/2003 | Sones | 33/508 |
| 2004/0172843 A1 * | 9/2004 | Sones | 33/508 |
| 2006/0166757 A1 | 7/2006 | Butler, Jr. et al. | |
| 2008/0201107 A1 * | 8/2008 | Doherty et al. | 702/182 |
| 2010/0083518 A1 * | 4/2010 | Kramski | 33/508 |

OTHER PUBLICATIONS

PCT/US2008/088618 International Search Report, Mar. 3, 2009, KB Golf Manufacturing, Inc, pp. 1-4.
PCT/US2008/088618 Written Opinion of International Searching Authority, Mar. 3, 2008, KB Golf Manufacturing, Inc., pp. 5-14.
PCT/US2008/088618 Current Claims, International filing date Dec. 31, 2008, KB Golf Manufacturing, Inc., pp. 1-9.

* cited by examiner

*Primary Examiner* — G. Bradley Bennett
(74) *Attorney, Agent, or Firm* — Hickman Palermo Truong & Becker LLP

(57) ABSTRACT

A golf club fitting apparatus comprises an image display unit; a linear guide having a lower end that is attached to the image display unit and rotatable in relation to the unit; an arm that is attached to the linear guide and slidable in relation to the linear guide; a first encoder coupled to the linear guide and configured to generate a rotation signal when the linear guide is rotated relative to the image display unit; a second encoder capable of generating a linear measurement signal when the linear guide slides; and image display logic coupled to the first encoder, second encoder, and image display unit and which when executed by one or more processors causes displaying a golf club head image on the image display unit, and re-displaying the image in a changed configuration in response to one or both of the rotation signal and the linear measurement signal.

40 Claims, 15 Drawing Sheets

FIG. 10A

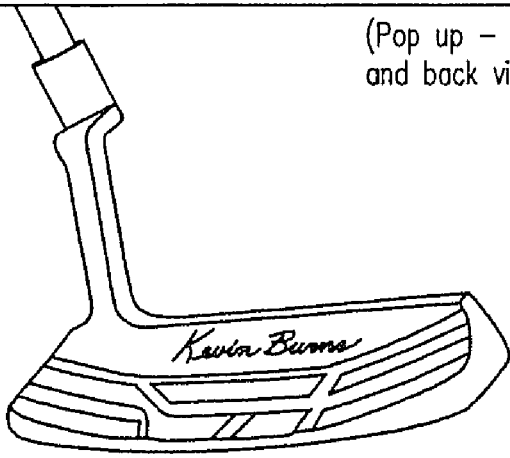

(Pop up – show top, front and back views w/ specs)

Model K-04 – (Over The Hosel Neck)

Design: 2 tier heel-toe weight
Construction: One piece machined milled carbon steel
Neck Design: Over the Hosel
Balance: 1/4 hang
Headweight: Calculated to putter length
Swing Weight: D-4, +/-1
Loft: 3.5 degrees standard
Lie Angle: YOU-niquely accurate to golfer's putting stance
Offset: 1/2 shaft
Length: YOU-niquely accurate to golfer's putting stance
Finish: ??????, non-reflective, rust proof
Inserts Available: Exposed copper / Hidden copper / None
Shaft: True Temper reduced taper tip
Grip: Winn Grip / Designed by KB Golf
Sight Line: You have a choice
Headcover: Leather, included

| Click here to order |

FIG. 10B

*Your specifications are built into the putter*

YOU-nique Fit System | Putters | Accessories | Company Info | Authorized Retailers | My Account | Customer Service Welcome to the Online ordering page.

We highly recommend utilizing the YOU-nique Fitting System when purchasing your putter. If you are unable to access our fitting system, we may be able to craft a putter for you anyway. Please remember, however, that since these measurements are not derived from the YOU-nique Fit System, optimum fit cannot be guaranteed.

Home | Site Map | Legal
2006 Kevin Burns Golf, Inc.

Model K-02 - Over The Hosel

Design: 2 tier heel-toe weight
Construction: One piece machined milled carbon steel
Neck Design: Over the Hosel
Balance: 1/4 hang
Headweight: Calculated to putter length
Swing Weight: D-4, +/-1
Loft: 3.5 degrees standard
Lie Angle: YOU-nique accurate to golfer's putting stance
Offset: Adjusted by the YOU-nique fit system
Length: YOU-nique accurate to golfer's putting stance
Finish: Satin, non-reflective, rust proof
Inserts Available: Exposed copper / Hidden copper / None
Shaft: True Temper reduced taper tip
Grip: Winn Grip / Designed by KB Golf
Alignment Line: 3 alignment lines offered
Headcover: 4 color options offered Select grip size: ( Regular ) — 1006
Select putter length: ( 32 inches ) — 1008
Select lie angle: ( 67 degrees ) — 1010

Headweight: The recommended head weight is determined by the length and grip size. Click here for more information. If you have a specific weight in mind, please indicate here.

Select alignment marketing: A    B    C

Select alignment color: ( ■ Black ) — 1014
Engrave initials or name: ____ — 1016
Select engraving color: ( ■ Black ) — 1018
Select head cover color: ( ■ Black ) — 1020

[ Review Your Order ]  [ Add to Cart ] — 1022

*FIG. 10C*

GOLF CLUB FITTING APPARATUS AND METHOD

BENEFIT CLAIM

This application claims benefit of Provisional Appln. 61/021,624, filed Jan. 16, 2008, the entire contents of which is hereby incorporated by reference as if fully set forth herein, under 35 U.S.C. §119(e).

FIELD OF THE INVENTION

The present disclosure relates to fitting golf clubs to players. The disclosure relates more specifically to apparatus that can measure parameters of a golf club.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A golfer can achieve better performance on the course when the golfer's clubs are well fitted to the height and stance of the golfer. However, current approaches for fitting golf clubs to players are crude. Players can buy pre-manufactured sets of golf clubs in which one club size is intended to fit all golfers. Alternatively, a player can opt for custom fitting.

One present approach for custom golf club fitting typically involves a player repeatedly gripping and test-swinging multiple different sample clubs until the player identifies a sample club that appears to fit. A drawback of this approach is that the seller of the golf clubs must maintain an inventory of sample clubs in a large range of sizes. The approach is also impractical for most retailers because a large amount of storage space is needed to store an inventory of clubs for custom fitting. When the approach is multiplied across many different golf club product lines, the number of clubs required for accurate fitting is too numerous and the cost is too large for a large number of retail locations to implement it.

The approach is also tedious for the golfer, who must repeatedly grip, try, and evaluate many different clubs having different parameters such as shaft length, head lie angle, shaft flexibility, etc.

Golf club vendors typically address some of these issues by holding periodic club fitting events. For example, a truck carrying the inventory of clubs visits a country club, golf store or other retail outlet for a short period of time. However, for the golfer this approach is inconvenient because the golfer may not learn about the fitting event until too late.

Further using the foregoing approach to accurately fit a golfer may require the golf club vendor to make up dozens of clubs that fit only a small percentage of golfers, thus wasting manufacturing resources.

U.S. Pat. No. 5,469,627 shows a golf club fitting apparatus that uses electrical contacts and sensors to detect the length and angle at which a golf club has held. However, the use of electrical contacts as described in the '627 patent is believed to provide inaccurate measurements. Further, the '627 patent uses a single fixed fitting club head 14 (FIG. 1). If a golfer prefers to use a golf club head of a different type (such as a two-ball putter head rather than a blade putter head), the golfer cannot accurately visualize how a custom-made club with that golfer's preferred head will actually look and feel.

SUMMARY OF DISCLOSURE

The invention and the disclosure are summarized in the appended claims, which are the exclusive statement of the scope of the invention.

In one aspect, an apparatus comprises an image display unit; a golf club shaft apparatus having a lower end that is attached to the image display unit and that is slidable and rotatable in relation to the unit; and image display logic coupled to the golf club shaft apparatus and image display unit and which when executed by one or more processors causes displaying a virtual golf club head image on the image display unit, and re-displaying the image in a changed configuration in response to sliding or rotation of the golf club shaft apparatus.

In one aspect, the present disclosure provides a golf club fitting apparatus, comprising a shaft having a grip end and a bottom end; an elongated arm having a first end affixed to the bottom end of the shaft, and having a second end that is attached at an angle to a first linear slide member; a second linear slide member that is slidably attached to the first linear slide member and rotatably attached to a generally planar base; a linear encoder coupled to the first linear slide member; an angular encoder coupled to the second linear slide member; an image display unit affixed generally horizontally to the base; a data processor coupled to the linear encoder, the angular encoder, and the image display; logic coupled to the data processor and which, when executed by the data processor, causes: receiving a linear measurement from the linear encoder; receiving an angular measurement from the angular encoder; computing a length of a golf club and a lie angle of a golf club head based on the linear measurement and angular measurement; and displaying, on the image display, an image of the golf club head based on the linear measurement and angular measurement.

One feature of this aspect further comprises a network interface that couples the data processor to a data network, and the logic when executed causes the data processor to send the linear measurement and the angular measurement through the data network to a server. In another feature, the logic causes receiving a changed linear measurement from the linear encoder; receiving a changed angular measurement from the angular encoder; and re-displaying, on the image display, an updated image of the golf club head based on the changed linear measurement and changed angular measurement.

In one feature, the image of the golf club head is an image of a putter. In another feature, the image of the golf club head is an image of any one of a putter, an iron, a wood, a hybrid club, a wedge, and a metal wood.

According to another aspect, the disclosure provides an apparatus, comprising an image display unit; a linear guide having a lower end that is attached to the image display unit and rotatable in relation to the unit; an arm that is attached to the linear guide and slidable in relation to the linear guide; a first encoder coupled to the linear guide and configured to generate a rotation signal when the linear guide is rotated relative to the image display unit; a second encoder capable of generating a linear measurement signal when the linear guide slides; and image display logic coupled to the first encoder, second encoder, and image display unit and which when executed by one or more processors causes displaying a golf club head image on the image display unit, and re-displaying the image in a changed configuration in response to one or both of the rotation signal and the linear measurement signal.

In one feature, the arm comprises a shaft having a golf club grip attached to the shaft. In another feature, the first encoder is an optical rotary encoder. In yet another feature, the second encoder is an optical linear encoder.

In still another feature the apparatus further comprises data output logic which when executed causes generating an output rotation value and an output linear measurement value that represent a position of the arm.

In yet another feature the apparatus comprises data output logic coupled to the first encoder and the second encoder and which when executed causes generating an output rotation value and an output linear measurement value that represent a position of the arm; and golf club fitting logic coupled to the data output logic and which when executed causes reading the output rotation value and the output linear measurement value, determining a length of a shaft of a golf club based on the output linear measurement value, and determining an angle of the golf club shaft relative to the image display unit based on the output rotation value.

In a related feature, the golf club fitting logic is configured to determine a head weight of a head for the golf club shaft. In another feature, the golf club fitting logic is configured to determine a value of static loft at address for the golf club.

In yet another feature, a shaft having a golf club grip is removably attached to the arm.

In another variation, the apparatus further comprises data output logic coupled to the first encoder and the second encoder and which when executed causes generating an output rotation value and an output linear measurement value that represent a position of the arm; and golf club fitting logic coupled to the data output logic and which when executed causes reading the output rotation value and the output linear measurement value, determining a length of a shaft of a golf club based on the output linear measurement value, determining an angle of the golf club shaft relative to the image display unit based on the output rotation value, and communicating the output rotation value and the output linear measurement value over a data network to a data processing system associated with a maker of custom golf clubs.

In one feature, a shaft having a golf club grip is removably attached to the arm, wherein a length encoder is coupled to the shaft, wherein the golf club fitting logic is coupled to the shaft and is configured to determine a length of the shaft based on a signal received from the length encoder. In another feature, a spring is coupled to the linear guide and the image display unit, and positioned to urge the linear guide to rotate to a generally upright position.

In another aspect of the disclosure, an apparatus comprises an image display unit; a linear guide having a lower end that is attached to the image display unit and rotatable in relation to the unit; an arm that is attached to the linear guide and slidable in relation to the linear guide, wherein the arm comprises a shaft having a golf club grip attached to the shaft; a first encoder coupled to the linear guide and configured to generate a rotation signal when the linear guide is rotated relative to the image display unit; a second encoder capable of generating a linear measurement signal when the linear guide slides; image display logic coupled to the first encoder, second encoder, and image display unit and which when executed by one or more processors causes displaying a golf club head image on the image display unit, and re-displaying the image in a changed configuration in response to one or both of the rotation signal and the linear measurement signal; data output logic which when executed causes generating an output rotation value and an output linear measurement value that represent a position of the arm; golf club fitting logic coupled to the data output logic and which when executed causes reading the output rotation value and the output linear measurement value, determining a length of a shaft of a golf club based on the output linear measurement value, determining an angle value for an angle of the golf club shaft relative to the image display unit based on the output rotation value, and determining a head weight value for a head weight of a head for the golf club shaft; communicating the output rotation value, the output linear measurement value, the angle, and the head weight value over a data network to a data processing system associated with a maker of custom golf clubs.

Still a further aspect of the disclosure provides a computer-implemented method, comprising receiving a rotation value and a linear measurement value from a first encoder and a second encoder that are coupled to an arm that is rotatable and slidable with respect to a base when the arm is held in a golf club ball address position; creating and storing, based on the linear measurement value, a length value for a length of a golf club; creating and storing, based on the rotation value, a lie angle value for a lie angle of the golf club.

One feature of this aspect further comprises communicating the length and the lie angle over a data network. Another feature comprises determining a head weight value for a head weight of a head for the golf club shaft. Another feature comprises determining a value of static loft at address for the golf club.

In another feature, a golf club head image is displayed on the image display unit, and re-displayed in a changed configuration in response to one or both of rotating the arm and sliding the arm. The golf club head image is an image of a head of any one of a putter, an iron, a wood, a hybrid club, a wedge, and a metal wood.

In another aspect, the disclosure provides a method of manufacturing a golf club, comprising establishing a data communication session over a network to a golf club fitting apparatus comprising a linear guide having a lower end that is attached to the image display unit and rotatable in relation to the unit, an arm that is attached to the linear guide and slidable in relation to the linear guide, a first encoder coupled to the linear guide and configured to generate a rotation signal when the linear guide is rotated relative to the image display unit, and a second encoder capable of generating a linear measurement signal when the linear guide slides; receiving over the network a length value, representing a length of a golf club, based on the linear measurement signal; receiving over the network a lie angle value representing a lie angle of the golf club based on the rotation signal; and making a golf club having a shaft having a length equal to the received length value and having a head lie angle equal to the received lie angle value.

In one feature, the method comprises receiving a head weight value for a head weight of a head for the golf club shaft, and making the golf club with a head having a weight equal to the received head weight value. In another feature, the method comprises receiving a static loft value representing a static loft at address of a head of the golf club, and making the golf club with a head having a static loft value equal to the received static loft value.

In yet another feature, the golf club comprises any one of a putter, an iron, a wood, a hybrid club, a wedge, and a metal wood. According to a further feature, the method comprises receiving over the network an output rotation value and an output linear measurement value that represent a position of the arm; determining the length of the shaft of the golf club based on the output linear measurement value; and determining the lie angle of the golf club based on the output rotation value.

Other aspects and features will be come apparent from the complete disclosure and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 10A, 10B, and 10C are diagrams of screen displays that a computer may generate for fitting a golf club using the method and apparatus herein.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Golf Club Fitting System

Figure 1A:
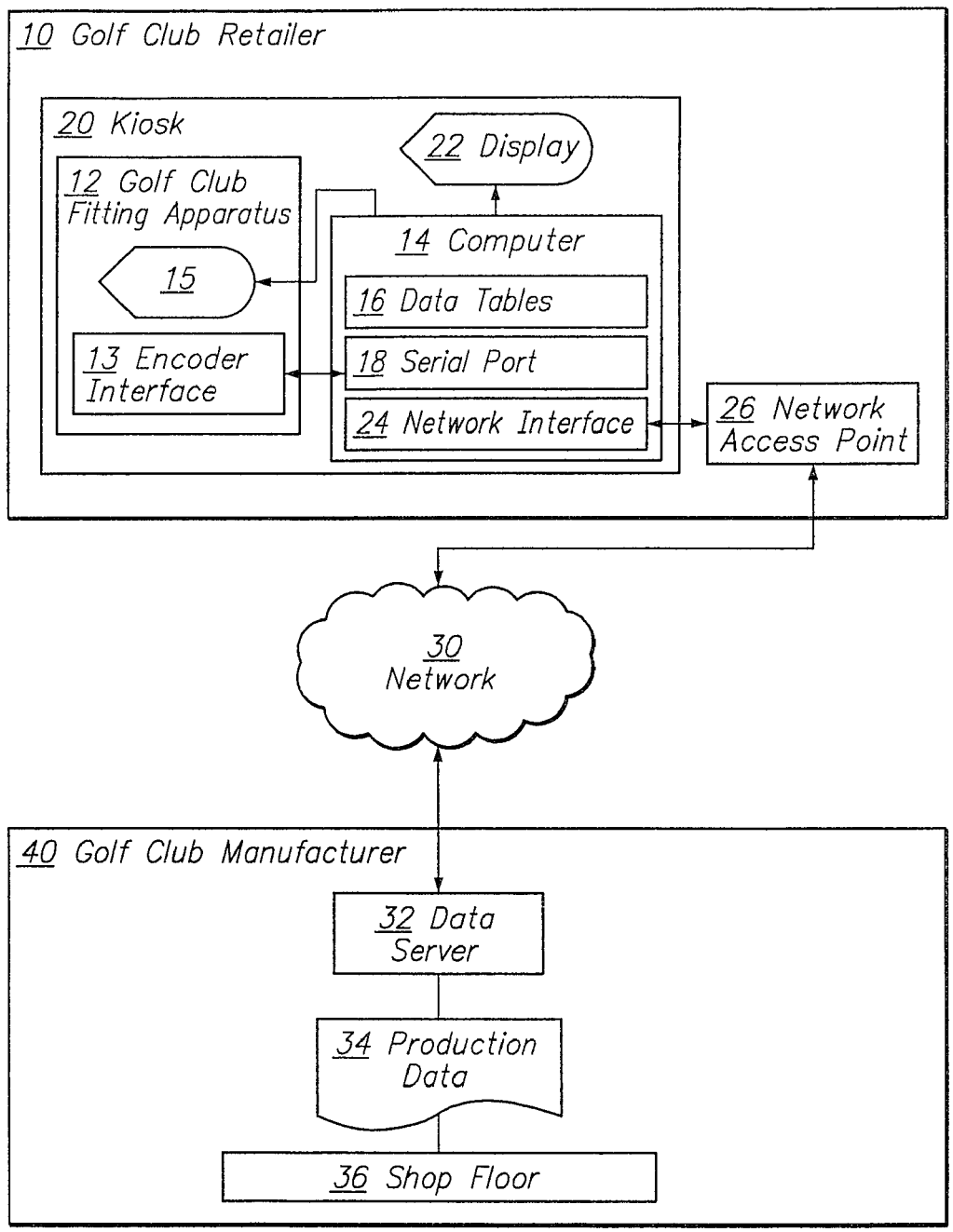
FIG. 1A is a block diagram of a golf club fitting system.

FIG. 1A is a block diagram of a golf club fitting system. A golf club retailer 10 has a kiosk 20 and a network access point 26. Golf club retailer comprises any location that can offer golf clubs for sale, including a retail store, pro shop, truck, trailer, shopping mall kiosk location, etc. In an embodiment, kiosk 20 comprises a golf club fitting apparatus 12, computer 14, and display 22.

Golf club fitting apparatus 12 comprises a movable golf club arm coupled to a plurality of encoders in a mechanical arrangement that is further described below with reference to FIG. 2-9 inclusive, and which is not shown in FIG. 1A for clarity. Generally, a customer grasps the arm of apparatus 12 and stands in a comfortable swing address position or playing position. A linear encoder of the apparatus 12 detects a length of a golf club that a customer prefers and an angular encoder detects a lie angle of a golf club head, based on the customer's stance in the swing address position.

Golf club fitting apparatus 12 comprises a display 15 and an encoder interface 13 that can provide data representing positions of the encoders to computer 14. In an embodiment, computer 14 is coupled to display 22 and to display 15. For example, dual video cards may be used in computer 14.

As further described herein, in an embodiment, the display 15 of the apparatus 12 displays a three-dimensional graphical image of a golf club head in a position that simulates the appearance of an actual golf club head when a player holds the apparatus 12 in a swing address position. As the customer moves an arm of the apparatus 12 linearly or angularly, software in computer 14 re-displays the golf club head image in a changed position that matches movement of the customer. Therefore, the customer can see a view of a virtual golf club head in display 15 that changes in real time as the customer's stance changes. The image in display 15 may also include a virtual golf ball, putting green, fairway surface, or other visual information.

The display 22 displays operational information, such as club selection parameters, customer identifying information, order information, etc., as further described herein. Display 22 may show information that computer 14 obtains in part over network 30 as part of interacting with data server 32. Display 22 may show stored web pages or other electronic documents and also may display pages that are obtained in real time over network 30 as part of interacting with data server 32 or other systems.

In various embodiments, displays 15, 22 may comprise LCD flat panel video displays, CRT displays, etc. In one embodiment, displays 15, 22 comprise 10" to 17" LCD flat panel displays, although the diagonal dimensions of the displays are not critical.

In an embodiment, computer 14 comprises data tables 16, serial port 18, and network interface 24. Data tables 16 store information about golf club products that are offered to customers through kiosk 20, club selection parameters entered by or for a customer, customer identifying information, order information, etc., as further described herein.

Computer 14 also hosts other software elements for controlling serial port 18, network interface 24, and other hardware, and for providing software functions as further described herein including generating and displaying 2D or 3D graphical images of a virtual golf club head. In one embodiment, computer 14 hosts an operating system such as Linux or OpenBSD, an Internet browser such as Netscape, Internet Explorer, or Firefox, OpenGL or Macromedia Adobe Flash for generating 3D displays, and application programs that perform the functions described further herein.

Serial port 18 is coupled to encoder interface 13 to receive data from encoders of apparatus 12 for use in computer 14. Using serial port 18, computer 14 can read values of the encoders and determine a then-current position of the apparatus 12 for use in fitting a player to a golf club, as further described herein. Computer 14 then can format the values into club selection parameters that are provided to a golf club manufacturer for use in custom manufacture of golf clubs.

In an embodiment, a linear encoder and angular encoder interface to an RS232 serial interface of the computer 14 through an interface board, such as the Millenium Research ENC232 encoder to RS232 interface board. The Millenium Research board can receive inputs directly from the encoders and provide RS232 output. In other embodiments, the encoders interface to computer 14 using a parallel interface, USB interface, FireWire interface, etc. In an embodiment, apparatus 12 comprises a computer and a network interface, so that the apparatus 12 and computer 14 comprise individual network-enabled elements that may be coupled using a network, such as an Ethernet-based LAN.

Network interface 24 of computer 14 is coupled to network access point 26, which may comprise a DSL modem, cable modem, telephone modem, router, or other interface to a network 30. A golf club manufacturer 40 has a data server 32 that is communicatively coupled to network 30.

In an embodiment, based on receiving from kiosk 20 over network 30 a customer order, which includes club selection parameters, customer identifying information, order information, etc., data server 32 generates production data 34, which is provided to shop floor 36. The golf club manufacturer 40 makes, either at shop floor 36 or indirectly through one or more subcontractors, one or more golf clubs that are custom-fit to the customer based on the received information. The golf club manufacturer 40 then provides or arranges to provide the custom-fit golf club(s) to the customer based on the received information.

Using the arrangement of FIG. 1A, a retailer can offer custom fitting of golf clubs without maintaining an inventory of clubs by providing the apparatus 12 for measuring player attributes and then delivering the attributes to an offsite manufacturer. The customer later returns to the retail location to pick up the custom made club. Using just-in-time manufacturing techniques and overnight courier shipping the time from custom fitting to delivery of a club can be as short as two days. The retailer is not required to maintain a large inventory of clubs, and the customer is not required to repeatedly try out multiple different clubs. The measurements that the apparatus collects are highly accurate.

Figure 1B:
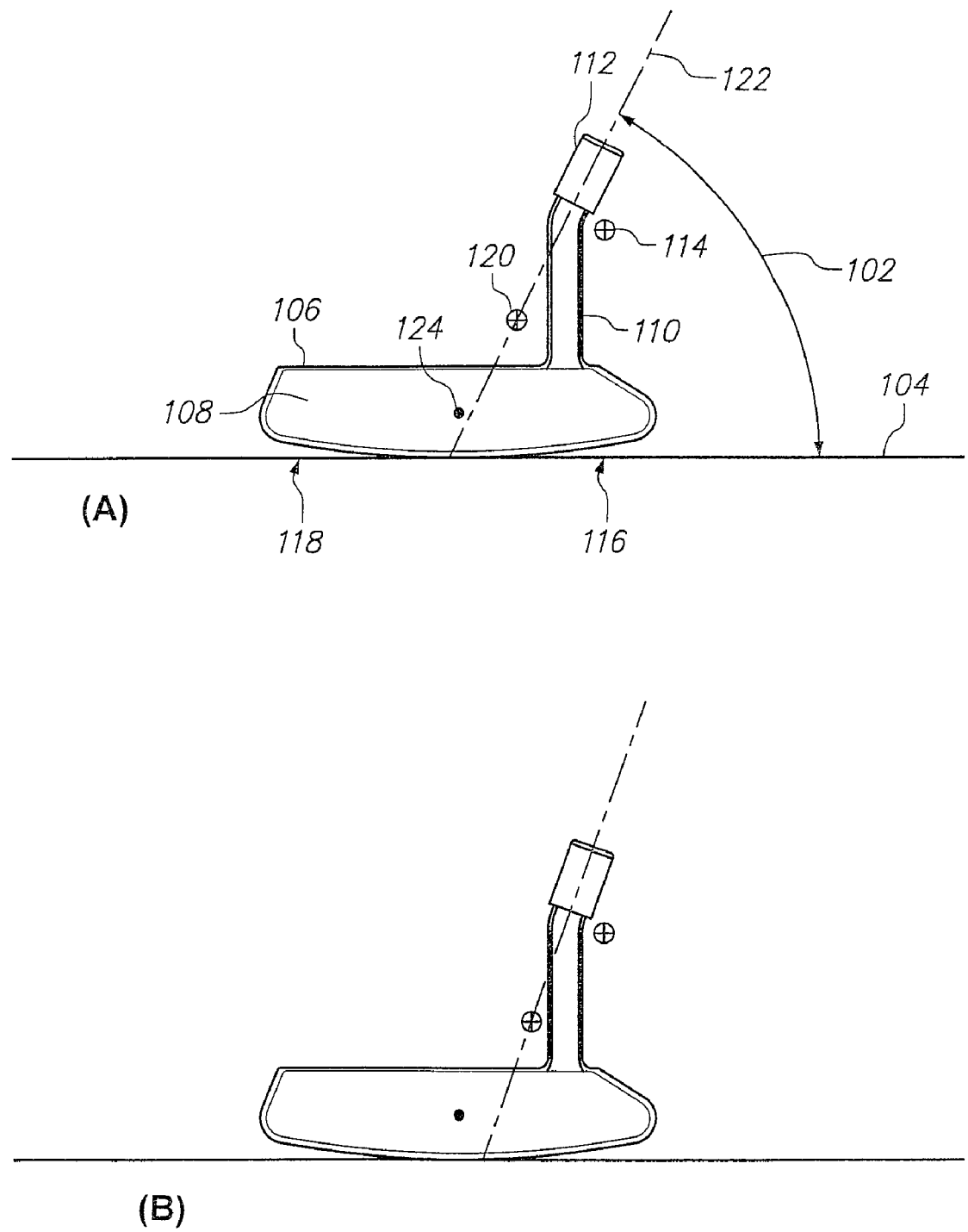
FIG. 1B illustrates angular relationships of the head and shaft of a golf club.

FIG. 1B illustrates angular relationships of the head and shaft of a golf club in two views labeled A and B. Referring first to view A, a golf putter 106 comprises a head 108 that is affixed to a neck and an angled shaft element 112. Golf clubs and putters are commonly constructed with the shaft affixed to the body of the club at an angle relative to the ground, as viewed from the striking face of the club, known commonly as the "angle of lie", or "lie angle" 102, as seen in view A. In the apparatus herein, the angle can be set to between 63 degrees and 80 degrees from the horizontal 104, or an angle lesser or greater, limited only by applicable golf sanctioning bodies' regulations. The range of values for lie angle 102 can accommodate a wide distribution of player stances and putting styles, as well as the variety of construction of the putter to be fitted.

In an embodiment, a virtual display represents and displays an image of the putter 106 from the viewpoint of the player seeking to have a putter fitted to the player. The displayed position and shape of the putter head 108 is updated in real time on the display by the fitting system processor to precisely match the configuration being fitted. Though the location of the bend 114 in the putter neck 110 can vary widely among different putter styles, and be closer or nearer the ground, towards the heel end 116 or toe end 118 of the putter, a pivot point 120 used in computations within the fitting apparatus 12 is fixed at an arbitrary point which is convenient mechanically, based on a known position of the center of the neck bend 114. Thus the displayed image of the putter neck 110 must move in unison with the fitting apparatus shaft 218 and grip 214 as if it were a real putter in the hands of the player being fitted. Further, a value for the position of the center of the neck bend 114 for different golf club models may be stored data tables 16 and retrieved by computer 14 for use in displaying images of virtual clubheads correctly.

In the embodiment, of FIG. 1B view A, the pivot axis 122 terminates at a pivot point 120 that is offset by 0.666 inches from a center 124 of the putter 106 and the lie angle 102 is 63 degrees. In the embodiment of FIG. 1B view B, the pivot axis terminates at a point that is offset by 0.834 inches from a center of the putter and the lie angle is 70 degrees. For other lie angle values the pivot axis 122 may terminate at other offset points.

In an embodiment, a three-dimensional model of the putter 106 is constructed in a Computer Aided Design (CAD) software program. The model is positioned in an assembly containing a model of the fitting apparatus 12, such that the lie angle 102 of the putter 106 can be changed, and the shaft axis 122 of the putter is concentric with the shaft and grip of the fitting apparatus, while the head 108 of the putter 106 remains horizontal and centered in the field of view laterally. If the pivot axis 120 of the fitting apparatus 12 were placed exactly at the center of the bend 114 of the putter 106, the only change visible in the display 15 as the neck angle changed would be the shape of the neck as it moves through its angular range. If, however, the location or center of the putter neck bend and the location of the fitting machine arm pivot are not coincident, the putter will move nearer or closer to the player as the neck angle changes.

The images displayed on the display 15 of fitting apparatus 12 are rendered using the photorealistic rendering module within Solidworks or a similar CAD program. The images are rendered from the perspective of the player with his eye directly above the ball vertically, which is a putting stance that is accepted as correct. A sequence of still graphical images, covering the entire range of lie angles, is rendered at an angular interval of approximately 0.2 degrees, or more or less, as appropriate to depict smooth motion. Images can be rendered from the perspective of a player of average height, or many sequences of images can be generated from the perspective of players of different heights as may be needed for players of different stature. Additionally, a standard head tracking mechanism can be employed to allow any possible player perspective to be rendered.

In an embodiment, the images are transferred to the processor of the fitting apparatus 12 and displayed in synchronization with the angle of the fitting machine pivoting arm, such that the image of the putter appears exactly as it would if a real putter were positioned on the floor. Additionally, two sets of images, rendered from the perspective of each eye can also be employed with an appropriate display capable of generating stereo images.

2.0 Golf Club Fitting Apparatus

Figure 2:
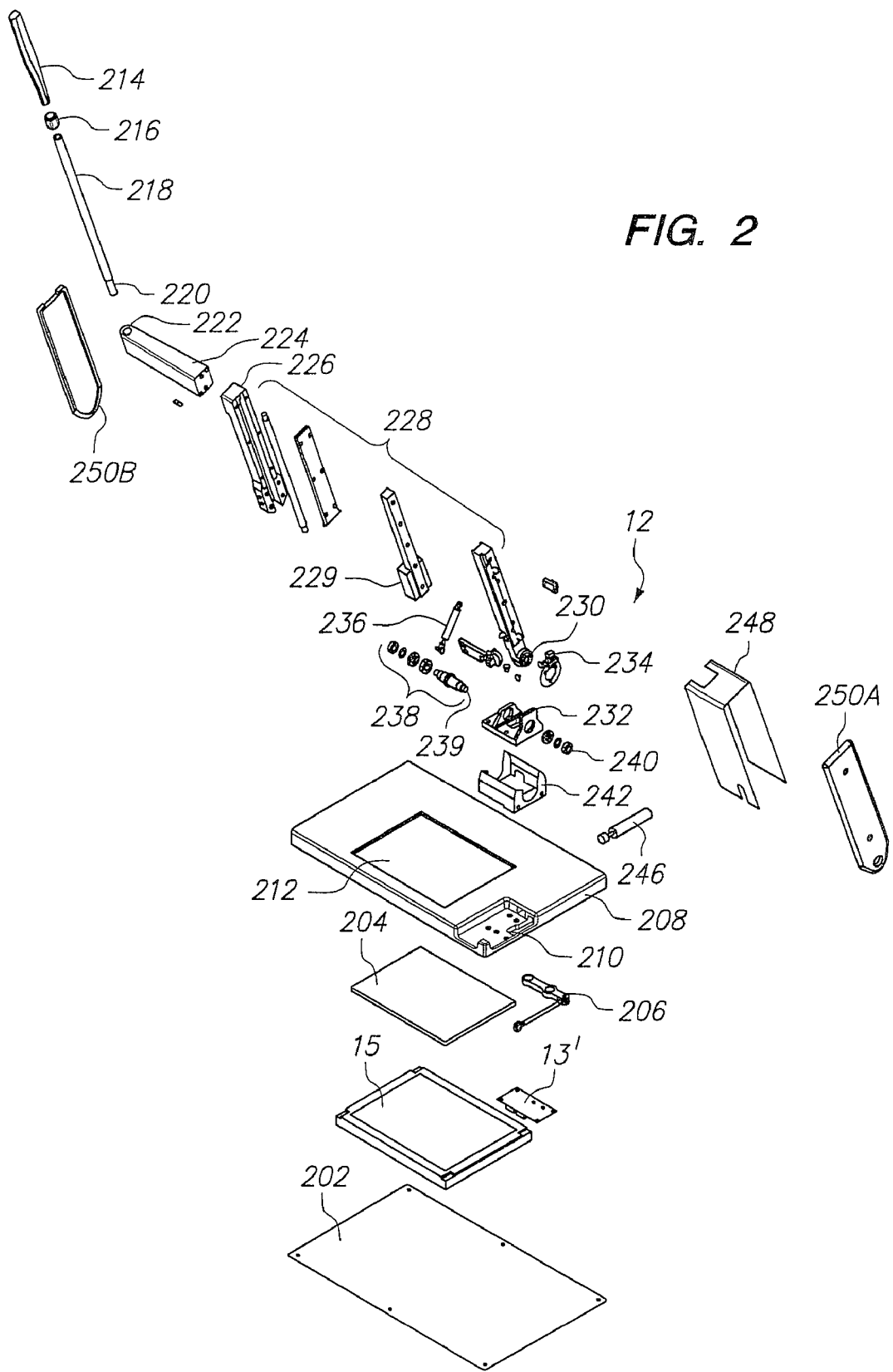
FIG. 2 is an exploded perspective view of a golf club fitting apparatus.

FIG. 2 is an exploded perspective view of a golf club fitting apparatus. In an embodiment, a generally rectangular, planar base plate 202 and a generally rectangular, planar top plate 208 having a hole 212 form a housing for display 15 and a circuit board 13', which may comprise encoder interface 13 (FIG. 1A). A transparent protective sheet 204 overlays the display 15 to protect the display from scratches, dirt, or damage. The circuit board 13' is received in a recess in an underside of top plate 208. In this arrangement, images appearing on display 15 are visible through hole 212 when a user is looking downward toward the top plate 208.

Top plate 208 comprises a recess 210 in which a sliding, rotating arm assembly is mounted to enable a person to grasp a simulated golf club and to slide and rotate the shaft of the club until the shaft is in a comfortable position at address of a simulated golf ball. In an embodiment, a grip 214 is affixed to a shaft 218, which comprises a lower end 220 that is affixed in a generally upright or vertical orientation in a hole 222 of a first end of an arm 224. End 220 and hole 222 may be threaded and retained in place by a nut 216 to facilitate removing and replacing the shaft 218. In this arrangement, the grip 214 and shaft 218 may be removed from the apparatus 12 and a different grip and/or shaft having a different length or other characteristics may be mounted on arm 224. In an embodiment that is used for fitting putters, for example, the arrangement of FIG. 1A allows using an interchangeable shaft for custom fitting a belly putter or long putter.

A second end of the arm 224 is affixed perpendicularly to a top end of a linear guide rail 226 that forms one element of a sliding linear guide 228. In an embodiment, linear guide 228 allows about 10" (25 cm) to 12" (30 cm) of upward or downward linear travel of the shaft 218 in an axial direction; in various embodiments, linear guides of 10" to 32" may be appropriate.

Thus, in use, pulling up or pushing down on grip 214 vertically with respect to base plate 208 causes the grip, shaft 218, arm 224, and linear guide rail 226 to slide up or down with respect to linear guide 228. A digital linear encoder 229 is integrated into linear guide 228 and can generate digital electronic signals representing a relative linear position of the guide along its dimensions of travel. The linear encoder 229 is electrically coupled to circuit board 13' using wiring or cables that are omitted for clarity.

A lower end of the linear guide 228 comprises a hole 230 arranged perpendicular to a direction of travel of the linear guide. The linear guide 228 rotates around an axis of hole 230 on an axle 239 that is rotatably mounted in a bearing plate 232 using mounting hardware 238, 240 that comprises nuts, washers, ball bearings, etc. The bearing plate 232 is fixed in a case mount 242 that seats in recess 210 of housing 208 and is held in the recess using one or more fasteners such as machine screws, which are omitted for clarity.

The linear guide 228 may be protected within a housing 248 having right and left side plates 250A, 250B, respectively. The side plates 250A, 250B may have semicircular or beveled lower ends to permit the side plates to rotate through an angle of approximately 90 degrees when affixed to housing 248 and during rotation with respect to top plate 208. The side plates conceal the mechanism to prevent damage to the mechanism, personal injury, entanglement in the apparatus, etc.

Thus, in use, pulling or pushing grip 214 in a direction approximately perpendicular to linear guide 228 causes the grip, shaft 218, arm 224, and linear guide rail 226 to rotate with respect to axle 239 and base plate 208. An electronic digital angular encoder 234 is integrated into the lower end of the linear guide 228 for measuring an angular position of the lower end of the linear guide as the linear guide rotates on axle 239 and can generate digital electronic signals representing a relative rotational position of the guide or relative angular position of the guide or shaft with respect to a horizontal plane coplanar with the base 208 or ground surface. The angular encoder 234 is electrically coupled to circuit board 13' using wiring or cables that are omitted for clarity. In this disclosure, the terms "angular encoder" and "rotary encoder" are equivalent. The angular encoder 234 may be affixed to linear guide 228 using a shoulder bolt or other suitable fastener.

The apparatus 12 may comprise a gas spring 236 that is mounted to the linear guide 228 for urging the linear guide into a rest position or home position when no force is exerted on the grip 214 or shaft 218. Gas spring 236 may also function to dampen linear or rotational movement of the apparatus to prevent damage to its parts that could be caused by a user exerting excessive force on the apparatus. Gas spring 236 may also provide balance in the apparatus. In an embodiment, gas spring 236 is manufactured by Industrial Gas Systems, Inc. The gas spring 236 may be integrated into the linear guide system for compactness.

Additional dampening may be provided by an over-travel limiter or dampener 246 that is horizontally secured in recess 210 and to the linear guide 228 using a rocker arm and tie rod assembly 206. In this manner the linear guide will not slam into other parts of the apparatus when the shaft is moved suddenly or released by a user, and deceleration of the apparatus is smoothly controlled. An embodiment is further described below with respect to FIG. 8B.

Detecting that the apparatus has reached a home position can be performed by moving the arm past a fiducial that is optically detected. A signal indicating detection of the fiducial may be provided to computer 14 for use in software that interprets a position of the apparatus. In an embodiment, gas spring 236 is omitted and other mechanisms for damping or reaching a home position are used, such as gears, motors, wire springs, coil springs, etc.

Figure 3:
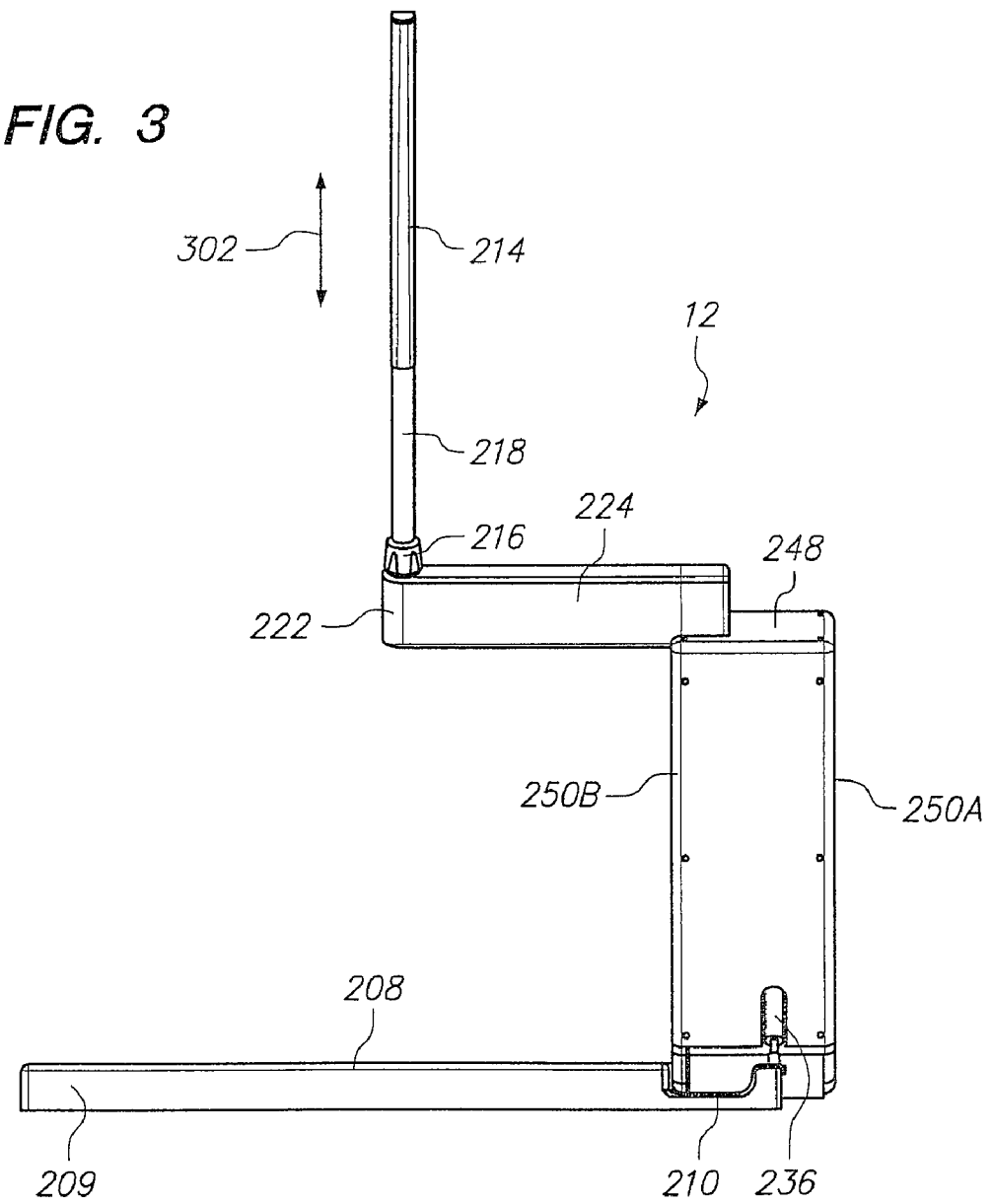
FIG. 3 is a front elevation view of the apparatus of FIG. 2.

FIG. 3 is a front elevation view of the apparatus of FIG. 2. The view of FIG. 3 approximates a view of a user of the apparatus as a user approaches the apparatus for use. In this arrangement a user may grip the grip 214 in a golf club address stance with the user's feet positioned adjacent to a front edge 209 of top plate 208 looking downward on the top plate. In this position the user may urge the grip 214 and shaft 218 upward or downward in the vertical linear direction generally indicated by arrow 302, thereby causing the grip 214, shaft 218, and arm 224 to move as a unit upward or downward with respect to top plate 208.

From FIG. 3 it is apparent that shaft 218 does not extend entirely to the base 208 or to an actual clubhead or base mechanism that simulates a clubhead. Instead, a display is in the base 208 and during fitting a virtual clubhead is displayed in the display using the techniques described further herein. However, the user may grasp the grip 214 and move the shaft upward or side to side until a comfortable holding position is reached.

Figure 4:
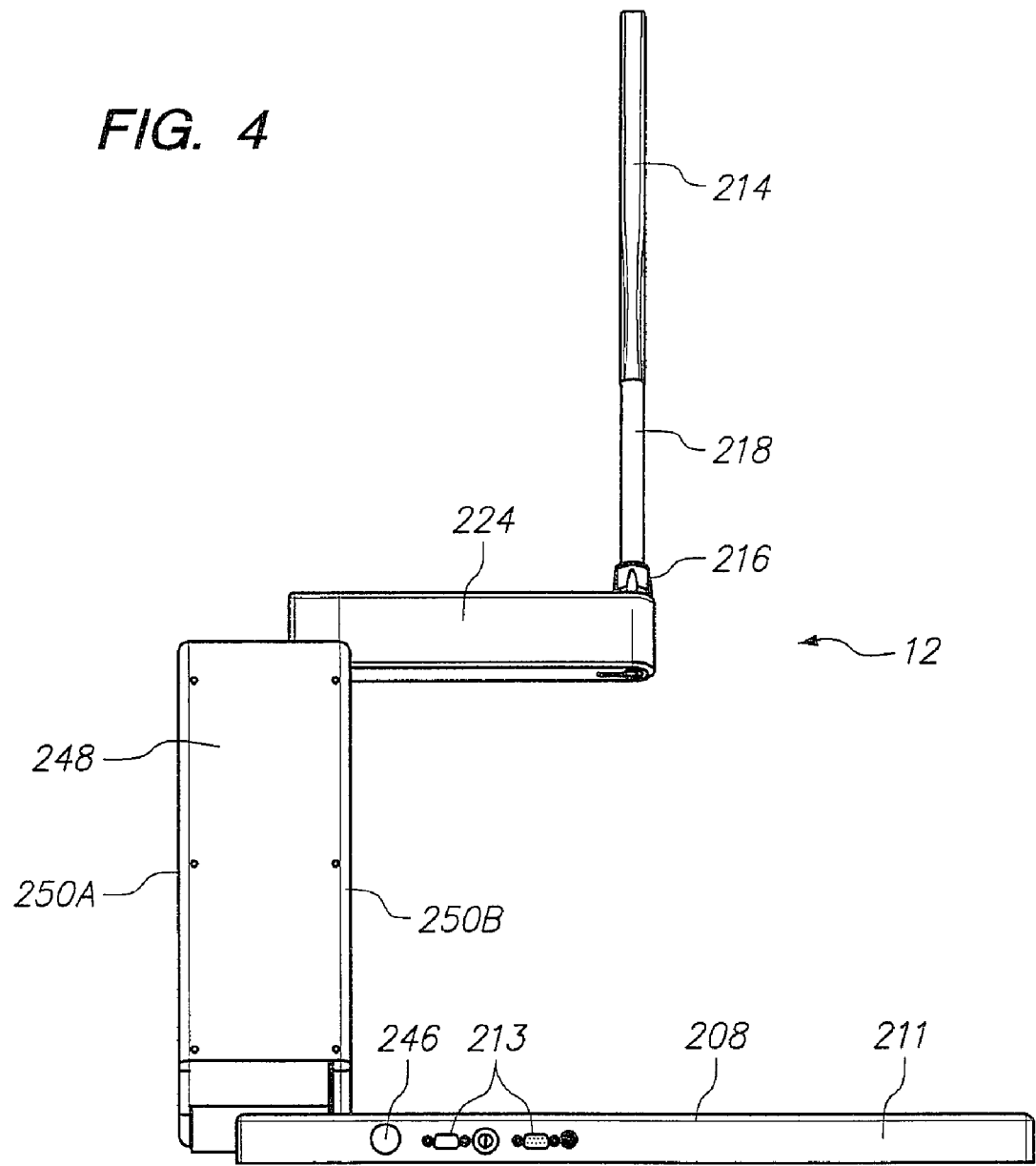
FIG. 4 is a rear elevation view of the apparatus of FIG. 2.

FIG. 4 is a rear elevation view of the apparatus of FIG. 2. In an embodiment, a rear edge 211 of top plate 208 comprises one or more connectors 213 for coupling signals from the display 15, linear encoder 229, and angular encoder 234 to the computer 14 (FIG. 1A).

Figure 5:
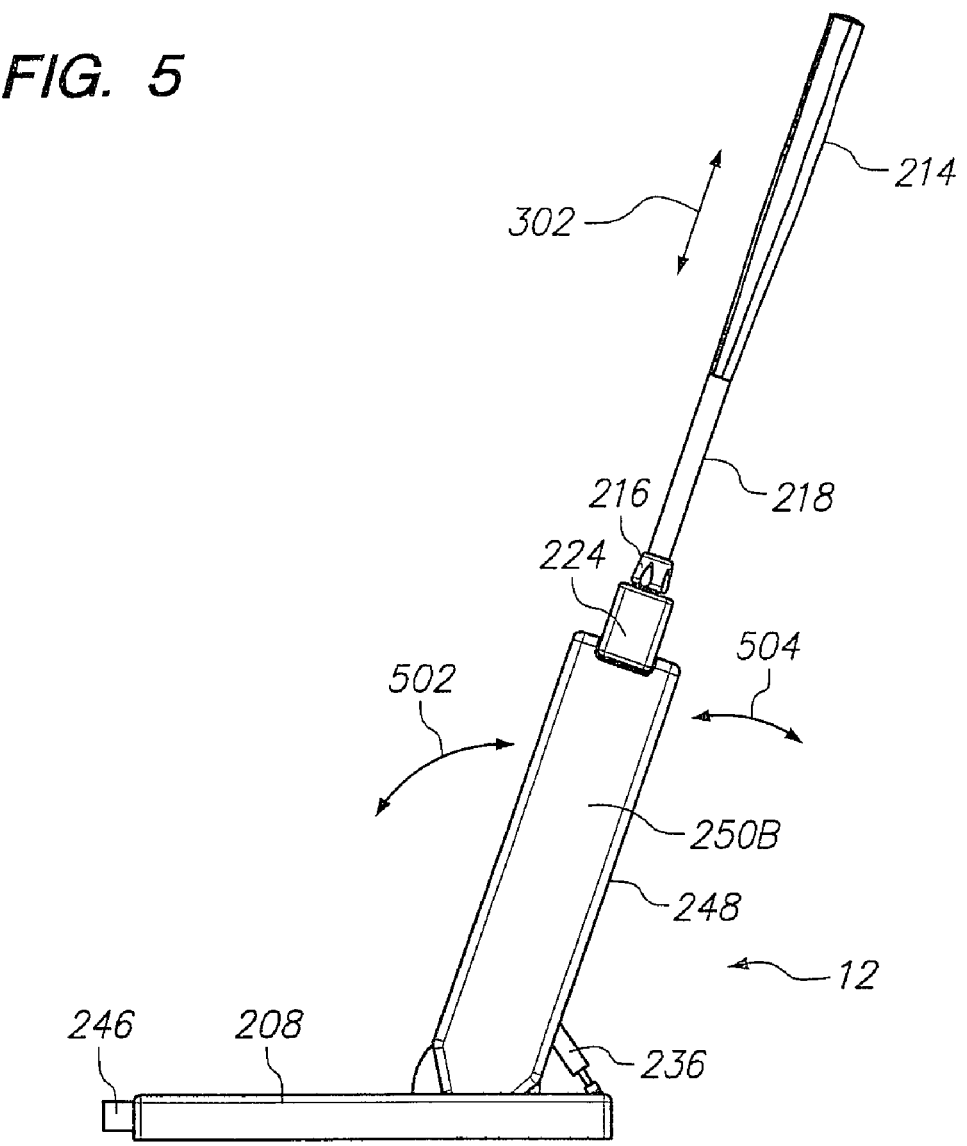
FIG. 5 is a left side elevation view of the apparatus of FIG. 2.
Figure 6:
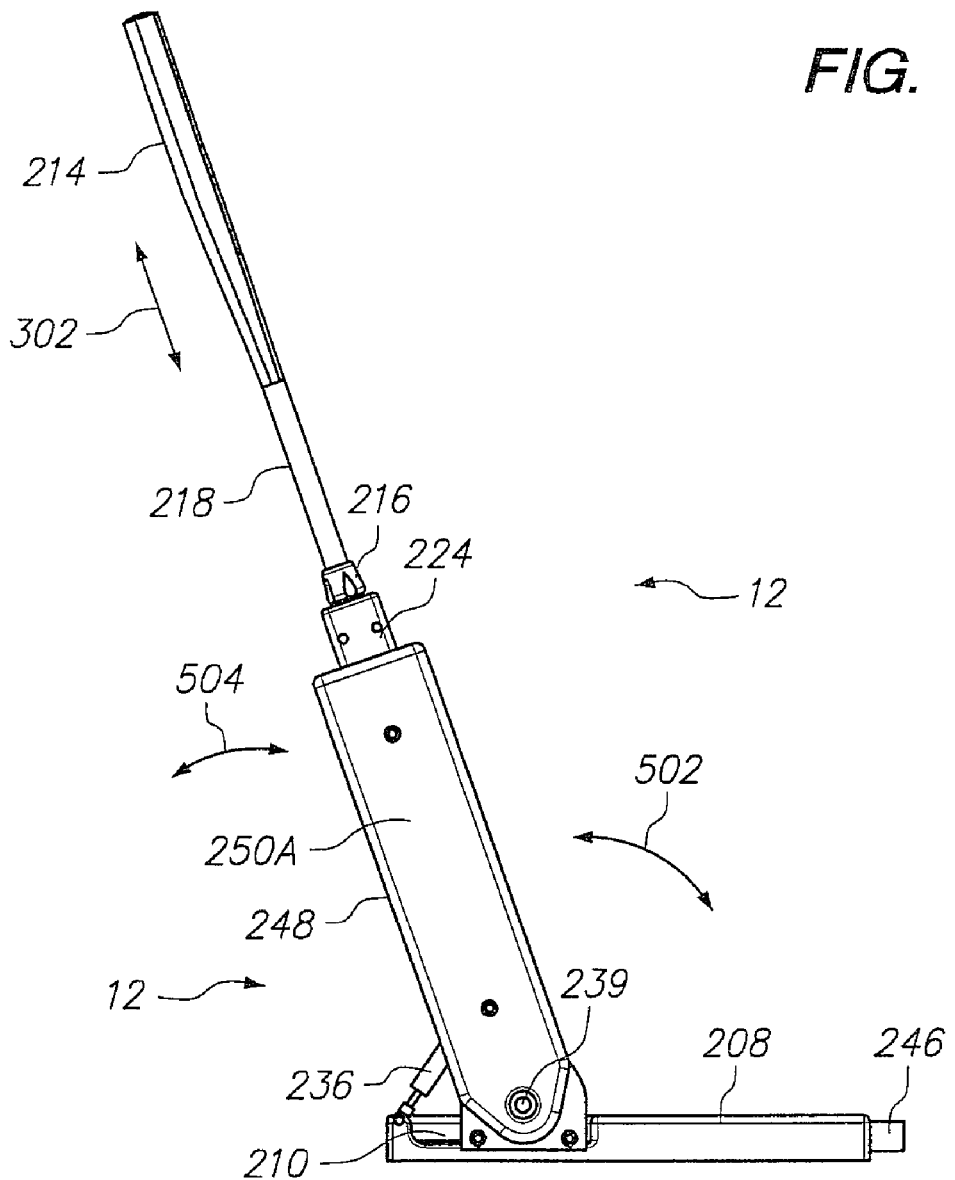
FIG. 6 is a right side elevation view of the apparatus of FIG. 2.

FIG. 5 is a left side elevation view of the apparatus of FIG. 2. FIG. 6 is a right side elevation view of the apparatus of FIG. 2. Arrows 502, 504 indicate a direction of angular or rotational motion through which the grip 214, shaft 218, arm 224, and housing 248 travel when a user urges the grip left or right with respect to base plate 208 as seen in FIG. 5. Moving the grip in such directions causes the grip 214, shaft 218, arm 224, and housing 248 to rotate about an axis of axle 239 as seen in FIG. 6. During such motion the gas lift 236 extends or retracts according to the movement of the shaft 218.

A user may simultaneously move grip 214 and shaft 218 upward or downward as arrow 302 indicates. Thus, the apparatus 12 provides two degrees of freedom that allow a user to rapidly move the apparatus to a comfortable golf swing address position. When the apparatus 12 is in such a comfortable position, values of the linear encoder and angular encoder may be used to determine a shaft length and lie angle for a golf club that is custom fit to the user's comfortable position.

Figure 7:
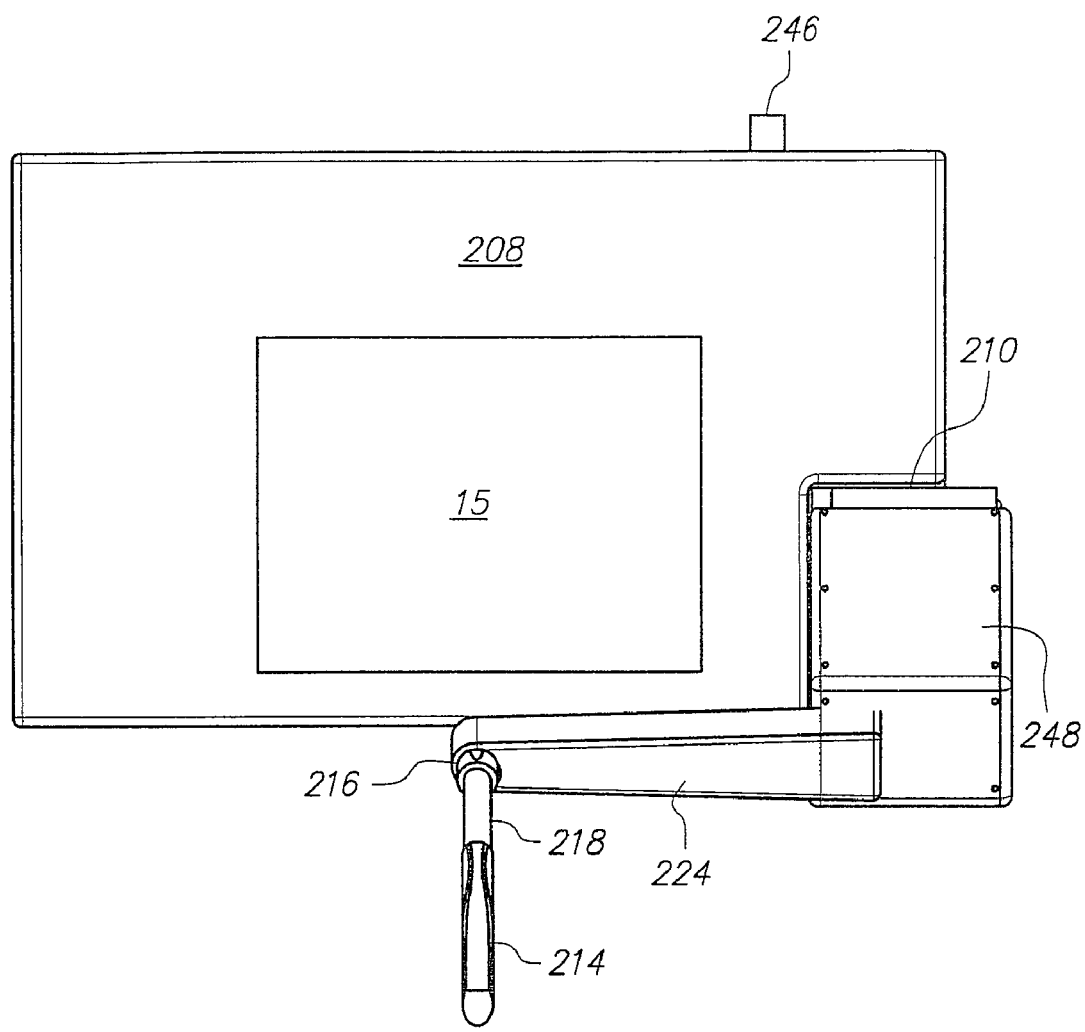
FIG. 7 is a top plan view of the apparatus of FIG. 2.

FIG. 7 is a top plan view of the apparatus of FIG. 2. FIG. 7 approximates a view of a user looking down on display 15 and about to grasp grip 214 to place the grip and shaft 218 in a comfortable golf swing address position. In such a position, the user can view display 15 to see an image of a golf club head at address of a golf ball as the grip and shaft are moved to a comfortable position.

Figure 8A:
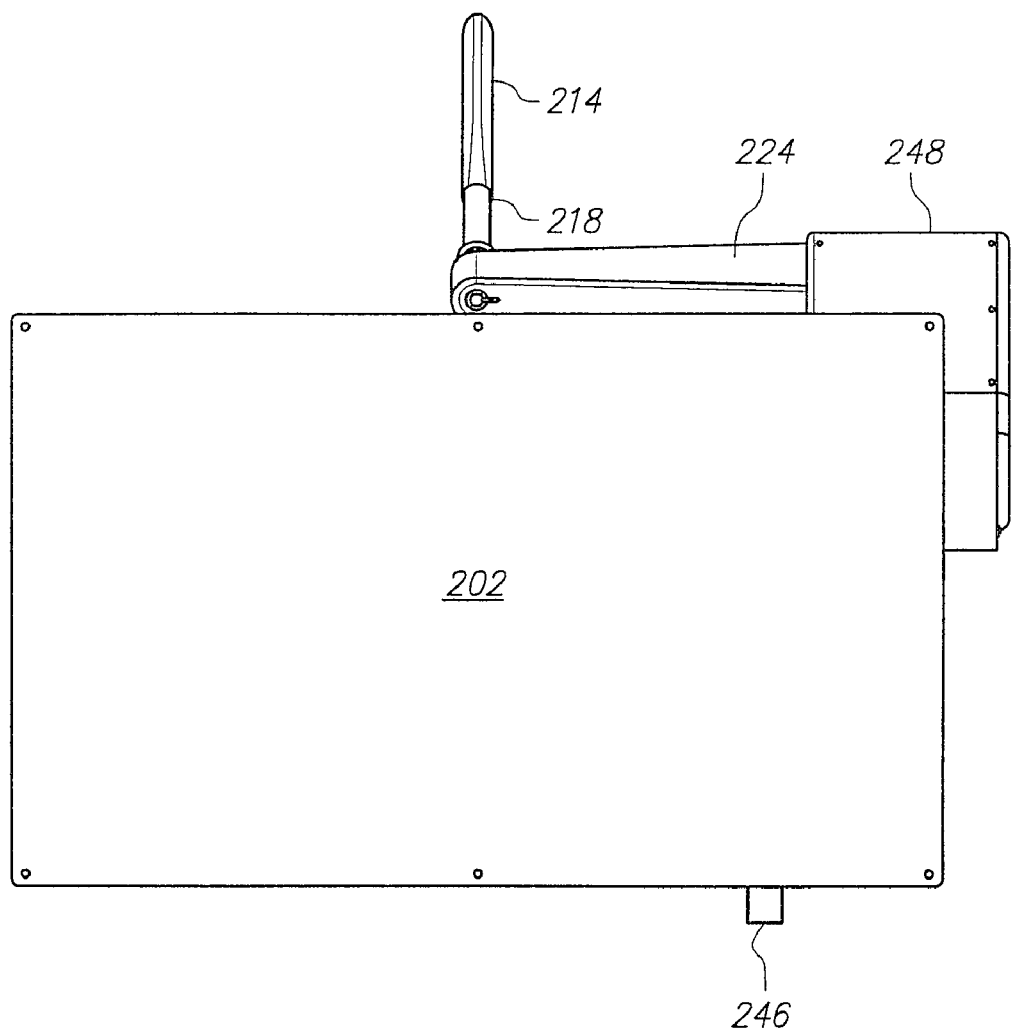
FIG. 8A is a bottom plan view of the apparatus of FIG. 2.
Figure 8B:
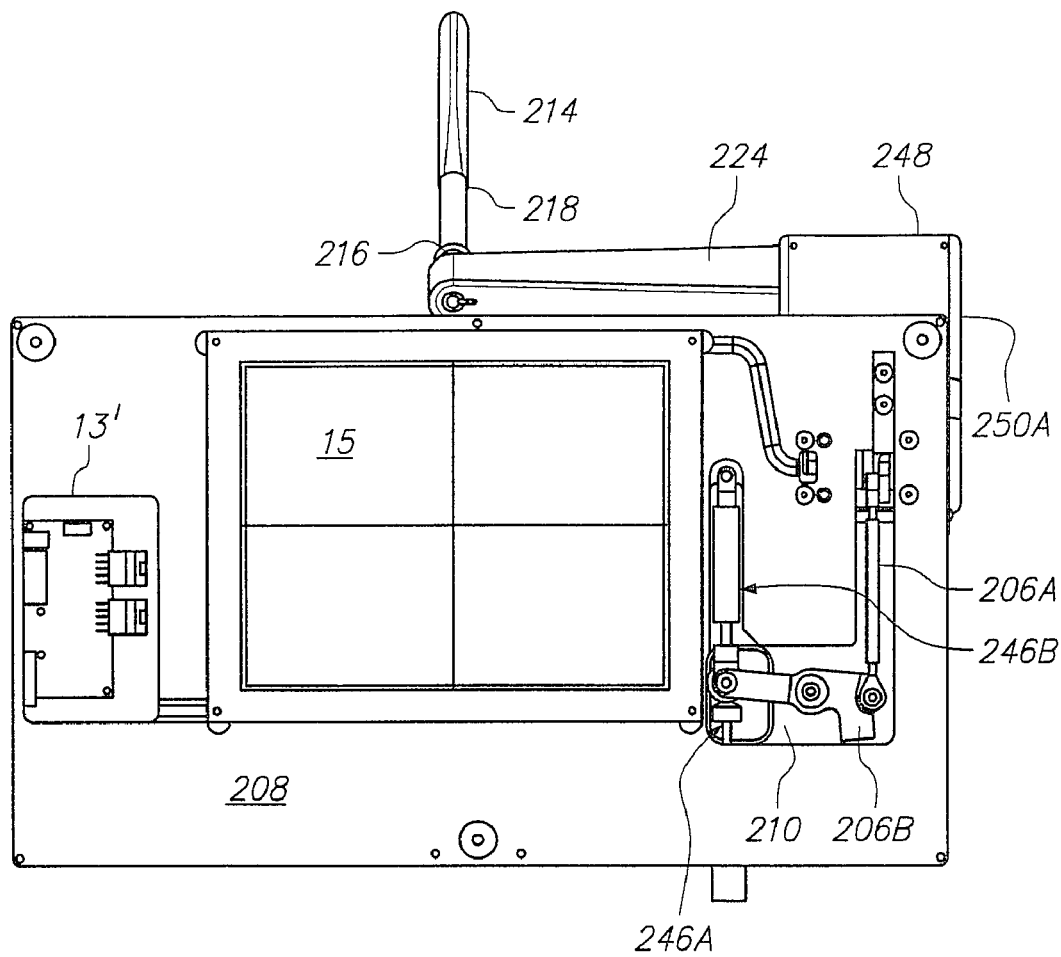
FIG. 8B is a bottom plan view of an alternative embodiment.

FIG. 8A is a bottom plan view of the apparatus of FIG. 2 further illustrating a mechanical arrangement of the base plate 202 in relation to housing 248, arm 224, shaft 218 and grip 214. FIG. 8B is a bottom plan view of an embodiment of the base of the apparatus with base plate 202 removed. In this embodiment, within housing 248 the linear guide 228 is attached to a tie rod 206A that is seated within recess 210 and connected to rocker arm 206B, which is secured to a gas spring 246B and end-of-travel damper 246A. As a result, releasing or suddenly moving the shaft 214 after rotating the shaft will cause the shaft to slowly return to a home position, urged by gas spring 246B yet dampened by damper 246A so that the gas spring moves the apparatus to the home position gently and softly stops at the home position. This approach is useful to reduce wear on the encoders, linear guide, and other mechanical elements.

For purposes of illustrating a clear example, FIG. 2-8 depict an apparatus having certain structural characteristics and interrelationships. However, alternative embodiments may use other structural characteristics and interrelationships while still falling within the scope of the claims and the spirit of the invention. For example, elements identified as rectangular, vertical, perpendicular, etc., may have different shapes or geometric relationships in various embodiments.

Further, various embodiments need not have each and every mechanical part that is shown in FIG. 2-8. The disclosure herein encompasses any embodiment having a shaft or the equivalent that is movable both linearly and angularly with respect to a base, or that can assume a variety of positions for a golf club at a swing address position.

In another embodiment, display 15 may be included in the apparatus 12 but not mounted in a base or floor mounted housing as shown for base plate 202 and top plate 208. For example, display 15 could be mounted at an angle with respect to the ground or vertical with respect to ground. Display 15 could be mounted on a post or arm that positions the display higher or closer to a customer or golfer who is gripping the grip 214. The size, shape and length of arm 224 are not critical and an embodiment can omit the arm 224.

The linear guide 228 may mount to the base plate 202 and top plate 208 using other mechanisms and may attach at different positions on the base. An assembly comprising grip 214, shaft 218, arm 224, linear guide 228, linear encoder 229, and angular encoder 234 may be detachable from the base and movable to another side of the base to accommodate a left-handed golfer.

In an embodiment, circuit board 13' is omitted and signals from linear encoder 229 and angular encoder 234 are coupled directly to computer 14 in kiosk 20. Interface circuitry within the kiosk 20 is responsible to convert signals from the encoders into other signals that computer 14 can read, such as serial interface signals.

3.0 Methods of Using the System and Fitting Apparatus

Figure 9:
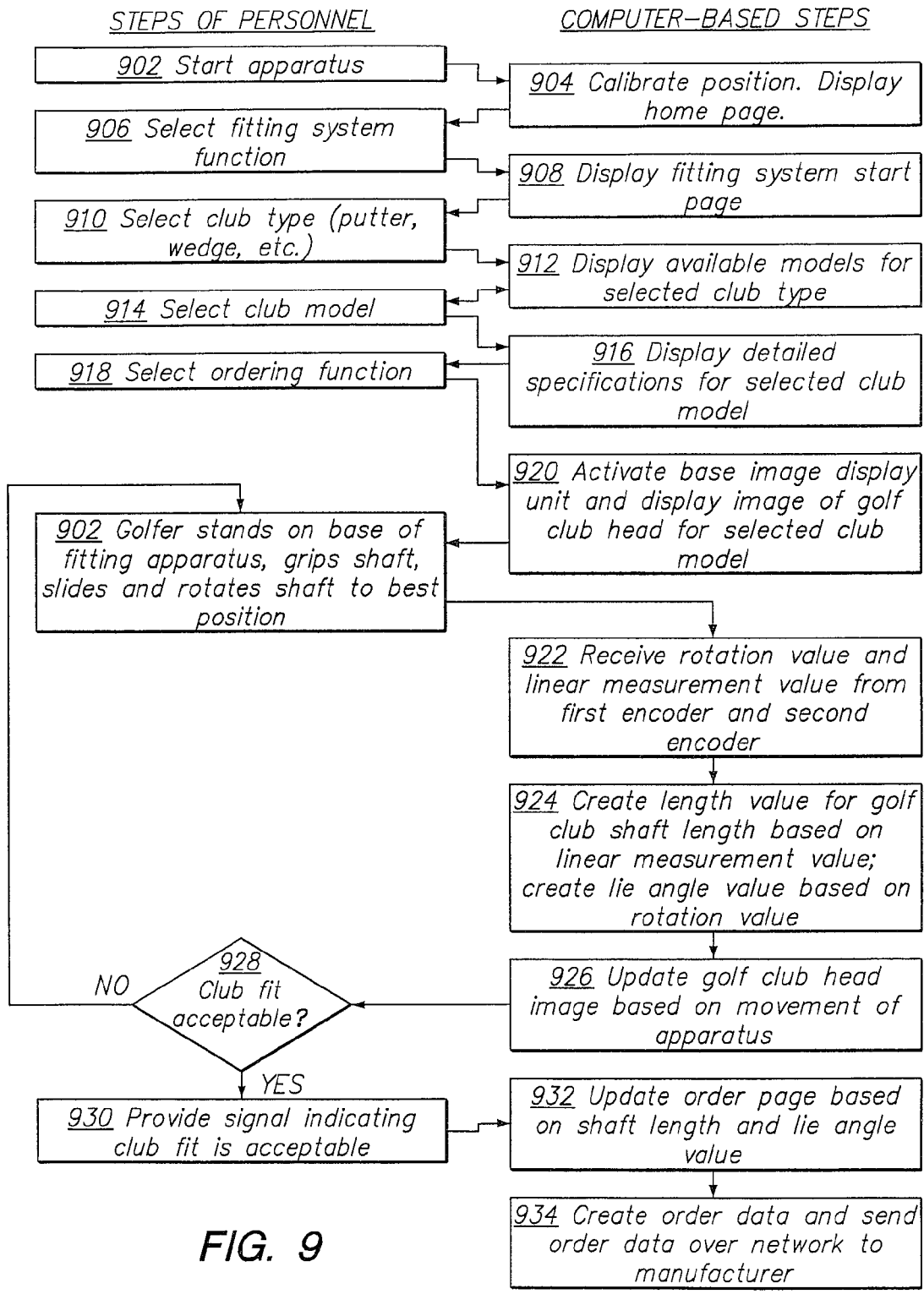
FIG. 9 is a flow diagram of a method of fitting a golf club.

FIG. 9 is a flow diagram of a method of fitting a golf club, according to one embodiment. To clearly illustrate an example, FIG. 9 shows steps that may be performed by personnel and steps that may be performed using a computer, such as through one or more computer application programs. However, other embodiments may use other combinations of steps, including a combination of steps that is exclusively performed by computer. Further, to clearly illustrate an example, FIG. 9 is described herein with reference to FIG. 1A-8B; however, the broad approach of FIG. 9 may be practiced with other apparatus in other embodiments.

In step 902, an apparatus is started. For example, a salesperson or other operator at golf club retailer 10 activates the golf club fitting apparatus 12. Activation may comprise applying power, restarting, rebooting, or awakening the apparatus 12 from an idle state. Activation also may be omitted in other embodiments in which the apparatus 12 is always in a ready state.

In response to activation, in step 904 the apparatus calibrates or determines the current position of the linear encoder and the angular encoder. Typically, the linear encoder and angular encoder are expected to be at or near home positions, and the calibration involves determining a current position of the encoders that represents the home positions.

In an embodiment, at step 904 the apparatus 12 also displays a start page or home page of a golf club manufacturer on display 22. In an embodiment, a browser of apparatus 12 displays the home page, and the home page provides general information about the manufacturer and provides an icon, link or other representation of a fitting system function. The apparatus 12 may retrieve a copy of the home page from local storage, or may request and retrieve the home page in real time over network 30. Local storage or network retrieval may be used in various embodiments for all page display steps described herein.

In step 906, the operator selects the fitting system function from the home page of the golf club manufacturer. An operator selection is provided, in an embodiment, by operator interaction with computer 14 using a mouse, touchpad, touch screen, or other data input device. In response, at step 908 the apparatus 12 displays a fitting system start page. In an embodiment, the fitting system start page identifies a plurality of different golf club types that can be custom fit to a customer using the apparatus, such as putter, wedge, hybrid club, etc.

In step 910, the operator selects a club type for custom fitting to a customer. For example, the operator provides user input selecting Putters from among several club types.

Figure 10A:
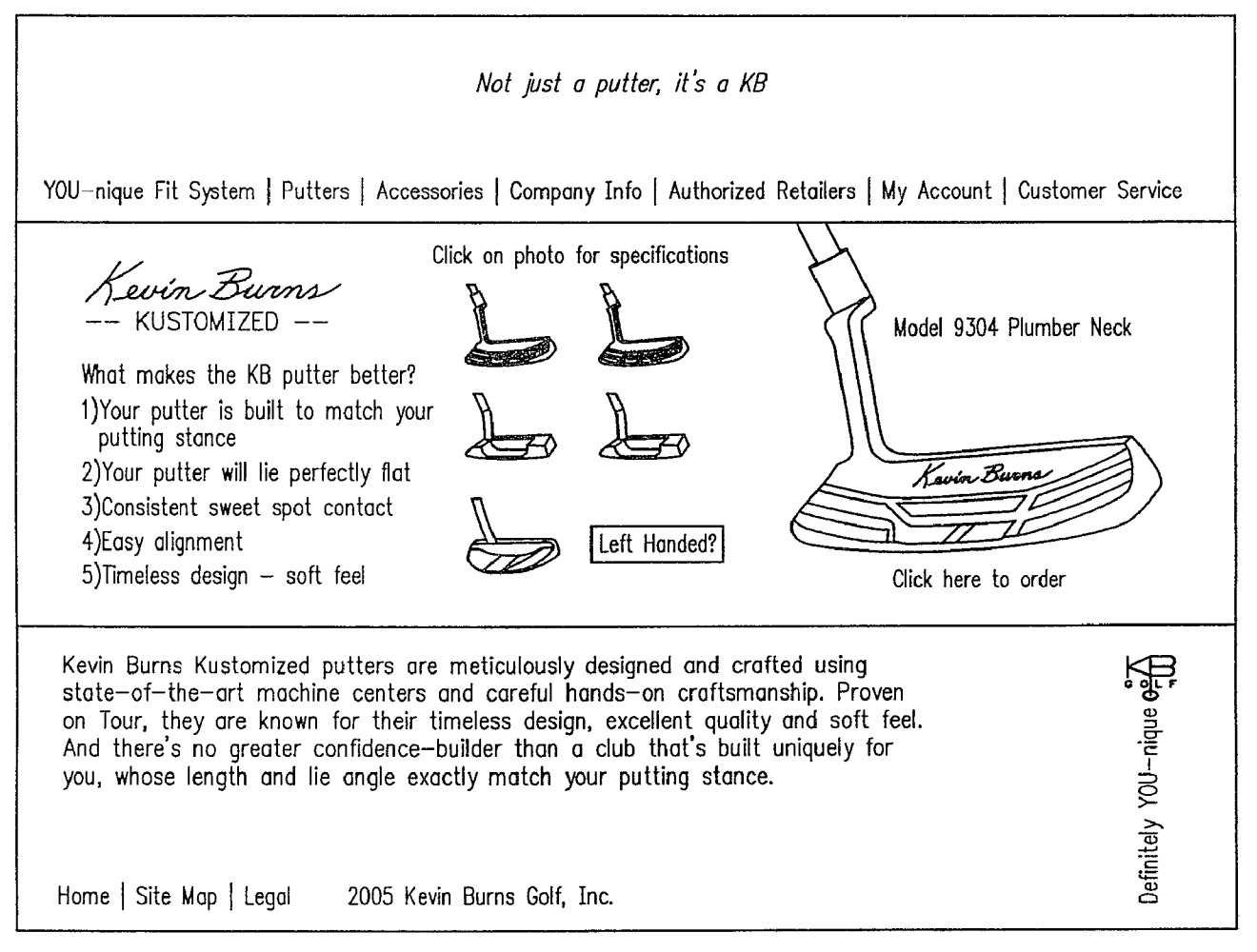

In step 912, the apparatus displays one or more available models for the selected club type. For example, display 22 shows one or more different putter types such as straight shaft with offset head, belly style, etc. In an embodiment, step 912 may comprise displaying only one model or step 912 may be omitted if a particular manufacturer does not offer multiple models. FIG. 10A illustrates an example screen display that may be generated at step 912.

In step 914, the operator selects a particular club model from among the available models shown in the display.

In response, in step 916, the apparatus may display detailed specifications for the selected club model. FIG. 10B illustrates an example screen display that may be generated at step 916. In an embodiment, the display of step 916 includes a button, icon or other GUI widget that identifies an ordering function. By selecting the ordering function, the operator indicates interest in fitting and ordering the corresponding club model.

In step 918, the ordering function is selected. In response, in step 920 a base image display unit is activated, such as display 15, and an image of a golf club head for the selected club model is displayed. In an embodiment, the image of a virtual golf club head is displayed in a display unit in the floor of the apparatus adjacent to the user's feet so that the image of the golf club head is rendered in a position and from a perspective approximately the same as the appearance of a real golf club head if a customer were holding a real golf club.

In an embodiment, the image is three-dimensional and comprises a virtual golf club head. In various embodiments the image may also display a virtual golf ball, putting surface, fairway surface, etc.

In an embodiment, the image is a static graphical image that is stored in the apparatus, and a plurality of images are generated in advance and stored in the apparatus at the time that the apparatus is manufactured, as described above in connection with FIG. 1B. SolidWorks software or an equivalent 3D CAD or modeling program may be used to create the images. For example, a 3D model of a particular type of clubhead is created in SolidWorks, and a macro is prepared that rotates the model through successive angles of rotation about the center of the neck bend 114 (FIG. 1B) and captures and stores static graphical images of the appearance of the clubhead at each successive angle. The number of successive angles may vary in different embodiments; for example, one image may be generated for every 2 degrees of rotation of the 3D model. Preparation of an appropriate model in the 3D CAD software requires knowledge of the point of rotation about the center of the neck bend 114 for the specific model or type of putter or other club that is to be fitted to a user using the apparatus 12.

The use of static graphical images enables the use of very high resolution images, if desired; in an alternative embodiment, a three-dimensional display of a virtual clubhead may be rendered based on a stored data model of a clubhead. Images appropriate for a left-handed golfer or right-handed golfer may be retrieved from memory and displayed on display 15 by computer 14 in response to data collected in steps 906-918 or another step.

In step 921, a customer or golfer stands on a base of the fitting apparatus, grips a shaft of a simulated golf club, and slides and/or rotates the shaft to the best position for that customer when in a playing stance or other position in which the customer addresses a ball before swinging the golf club.

In step 922, a rotation value and a linear measurement value are received from a first encoder and a second encoder of the apparatus.

In step 924, a length value representing the length of a golf club shaft is created based on the received linear measurement value, and a lie angle value is created based on the received rotation value. In an embodiment, step 924 involves mapping the received linear measurement value to a length value using a stored data table or spreadsheet, and similarly a lie angle value is determined by mapping or looking up the received rotation value in a data table. A spreadsheet may be used to create the mappings. Alternatively, computer 14 may apply algorithm transformations to the received values to result in length in lie angle values. In an embodiment, step 924 involves computing an angle of a golf club shaft to the ground in degrees, e.g., 67 degrees. In an embodiment, step 924 involves computing a shaft length of a golf club, e.g. 33".In an embodiment, head weight of a custom fitted golf club is determined based upon a stored data table or retrieved from a spreadsheet file.

In step 926, the golf club head image is updated and re-displayed based on any movement of the apparatus as represented in the received rotation value and linear measurement value. Successive images for re-display may be selected by comparing the received rotation value to a mapping stored in a data table that maps encoder values to names of corresponding still image files that represent the appearance of a clubhead when the shaft of a club is rotated according to the received rotation value. Thus, in an embodiment, while the user is sliding or rotating the shaft, one or more different still images of the virtual golf club head are re-displayed in the display 15. In an embodiment, the different still images are re-displayed rapidly in "flip-book" fashion so that the display appears to be animated and the virtual golf club head appears to be moving in coordination with the user's movement of the shaft. As a result, the user receives the illusion of gripping an actual golf club at address to a ball while adopting a stance, grip and position that is most comfortable for that user.

In step 928, the process tests whether the club fit is acceptable to the customer. Step 928 may involve, for example, determining whether the operator of the apparatus has selected a SELECT FIT button, icon or other identifier shown in display 22. If the operator has not made such a selection, then control returns to step 921. Using the loop formed by steps 921-928, the image is updated and re-displayed in real time based on real-time movement of the golfer or customer.

In an embodiment, logic in the computer 14 prompts the user to allow the apparatus 12 to move to a home position and re-perform step 921 a plurality of times, and steps 922-928 are automatically repeated as well. As a result, the computer 14 collects a plurality of successive measurements of the same individual repeatedly grasping the simulated club in a comfortable position, which has been found to increase the accuracy of fitting. In an embodiment, six (6) measurements are collected, the greatest and lowest values for rotation and linear measurement are discarded, and the remaining four (4) values are averaged to result in final values. In other embodiments, different numbers of values and blending algorithms may be used.

If the club fit is acceptable, then control transfers to step 930, at which the operator provides a signal indicating that the club fit is acceptable. Step 930 may involve, for example, the operator of the apparatus selecting a SELECT FIT button, icon or other identifier shown in display 22. In response, the system updates an order page shown on display 22 with the shaft length and lie angle value that were created at step 924.

FIG. 10C illustrates an example screen display that may be generated at step 924. In an embodiment, an order summary page 1001 is displayed on the display 22 of kiosk 20 and is filled in by the apparatus in part, and in part by a salesperson or other user as part of placing an order for a club. In an embodiment, the order summary page 1001 comprises club details 1002 and an image 1004 of the club head that the customer is ordering. Order summary page 1001 comprises a grip selection widget 1006 that can receive user input specifying a particular grip size.

Order summary page 1001 comprises a length value 1008 and a lie angle value 1010 that are automatically determined and displayed based upon a position of shaft 218 of apparatus 12 and values received from the apparatus. Thus, in an embodiment, length value 1008 and lie angle value 1010 have been received from the apparatus 12 and are automatically filled into the order summary page 1001 at the time it is displayed.

In an embodiment, order summary page 1001 comprises a head weight value 1009 that displays a default head weight value for the club and that provides an option to customize the head weight value. Thus, in an embodiment the head weight value 1009 is displayed in a text box or other GUI widget and a user may replace the head weight value with a different value. The default head weight value 1009 may be obtained from a look-up table or other stored data source that associates head weight values with length values 1008.

In an embodiment, for ordering putters, order summary page 1001 comprises a plurality of alignment marking options 1012. A user or customer may select one of the options 1012 to specify where an alignment mark should appear on the club. In an embodiment, order summary page 1001 comprises an alignment color option 1014 that can receive a user selection of a color for the alignment mark. Typical colors might include black, white, red, yellow, etc.

In an embodiment, order summary page 1001 comprises an engraving option 1016 that can receive user entry of a set of initials or a name to engrave on the club head or club shaft. In an embodiment, order summary page 1001 comprises an engraving color option 1018 that can receive a user selection of a color for the engraved initials or engraved name.

In an embodiment, order summary page 1001 comprises a head cover color option 1020 that can receive a user selection of a color of a head cover that the golf club manufacturer will ship with the custom fitted club to protect the head of the club when it is in a customer's golf club bag.

In step 934, order data is created and sent over a network to a manufacturer. For example, a user selects an "Add to Cart" button 1022 on a display of FIG. 10A and completes a shopping cart page sequence to provide personal information or payment details to complete an order. Step 934 may comprise creating an XML document containing order data or creating any other convenient form of message or transmission that can contain order data. The order data comprises at least the shaft length value and lie angle value that were created at step 924 and customer identifying information. Order data also may include shipping information, identifying information for golf club retailer 10 or kiosk 20, club identifying information, etc.

The order data also may include any of several other parameters for custom fitted golf clubs including head paint color, grip color, initials on club head, head cover color, etc.

The order data also may include a grip type and user selection of a different grip type can cause a change in the head weight value retrieved from the data table. In an embodiment, the order data comprises static loft at address expressed as either a left or right measurement. Static loft represents the loft of the clubface compared to a horizontal plane of the hosel of the club.

In an embodiment, the order data also may include a neck offset value, which may be selected from a set of values that are displayed on display 22.

In an embodiment, shaft 218 is interchangeable in the apparatus 12, and the apparatus comprises elements to automatically detect interchangeable shafts. For example, each shaft 218 may have a lower end that is encoded with optical indicia that are detected by an optical detector integrated into hole 222 or arm 224. Alternatively, each shaft 218 is keyed using holes, indentations, bosses or protrusions that mechanically depress or receive mechanically floating pins in the hole 222. In such an alternative, fitting a particular shaft 218 into hole 222 causes depressing a particular pattern of pins in the hole 222 that uniquely identify the shaft length. A signal representing the pin pattern, or optical indicia, is communicated from arm 224 to computer 14, which transforms the signal into a shaft length value for use in the custom fitting process.

Figure 11:
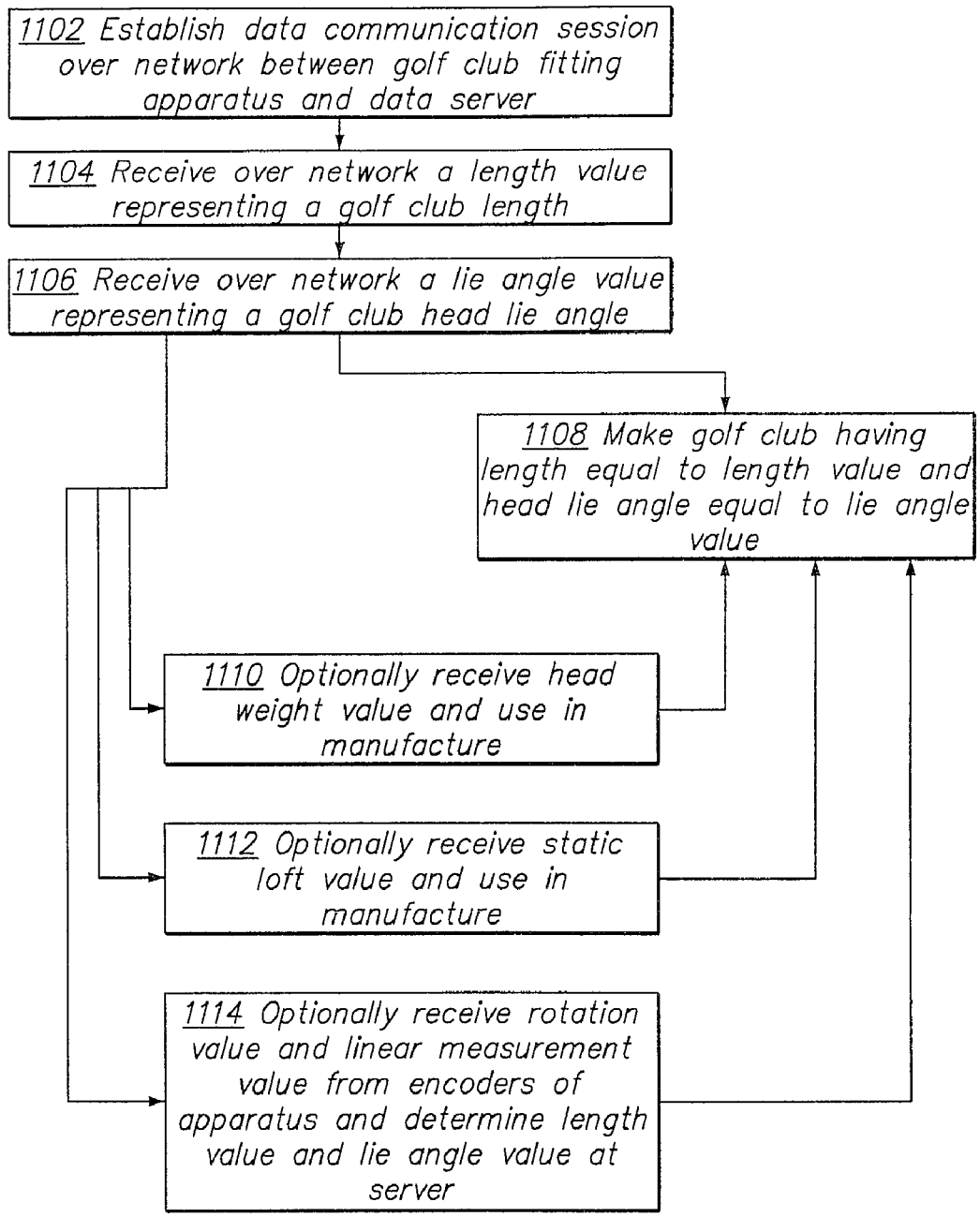
FIG. 11 is a flow diagram of a method of making a golf club.

FIG. 11 is a flow diagram of a method of making a golf club. In step 1102, a data communication session is established over a network between a golf club fitting apparatus and a data server. For example, in the context of FIG. 1A, computer 14 establishes a session through network 30 to data server 32. A session may comprise an HTTP request-response dialog, an FTP upload session, etc. The data server is at a golf club manufacturer, contractor, distributor, reseller, etc.

In step 1104, a length value representing a golf club length is received over the network. For example, data server 32 receives a length value from computer 14 that was created based on values received from encoder interface 13. Data server 32 may receive the length value in an XML document, HTTP request, or other message format or document format. In step 1106, a lie angle value representing a golf club lie angle is received over the network. The lie angle value may be received at data server 32 in the same XML document or HTTP request that carried the length value.

In step 1108, a golf club is made having a length equal to the received length value and a head lie angle equal to the received lie angle value.

At step 1110, optionally a head weight value is received and used in making the club at step 1108. A shaft length value also may be received or retrieved from a stored data table. Alternatively, a shaft length value alone may be received, and an optimal or appropriate head weight value may be retrieved from a stored table that maps shaft length values to head weight values for various golf club models or club types. Thus, the head weight used in manufacture can vary based on shaft length.

At step 1112 optionally a static loft value is received and used in making the club at step 1108. At step 1114 optionally a rotation value and linear measurement value are received from encoders of the apparatus and a length value and lie angle value are determined at the data server. Thus, step 1114 may involve receiving "raw" encoder position data values from the apparatus and converting the position values into length value and lie angle value. The resulting length value and lie angle value are used in making a golf club at step 1108.

The approaches of FIG. 9 and FIG. 11 may be combined to provide a complete, integrated custom golf club fitting and manufacturing method. Further, steps and sub steps of FIG. 9 and FIG. 11 may be recombined in ways other than shown in FIG. 9 and FIG. 11 in such a complete and integrated approach.

The fitting apparatus 12 and methods herein may be used with left-handed or right-handed users without modification to mechanical aspects of the apparatus. The user interface may capture and provide to the data server 32 information indicating whether the user is left-handed or right-handed. Computer 14 may also receive the values and select a different set of graphical image values for display on display 15, as part of the method of FIG. 9, depending on whether the user is left-handed or right-handed.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A golf club fitting apparatus, comprising:
a shaft having a grip end and a bottom end;
an elongated arm having a first end affixed to the bottom end of the shaft, and having a second end that is attached to a first linear slide member;
a second linear slide member that is slidably attached to the first linear slide member and rotatably attached to a generally planar base;
a linear encoder coupled to the first linear slide member;
an angular encoder coupled to the second linear slide member;
an image display unit affixed generally horizontally to the base;
a data processor coupled to the linear encoder, the angular encoder, and the image display;
logic coupled to the data processor and which, when executed by the data processor, causes:
receiving a linear measurement from the linear encoder;
receiving an angular measurement from the angular encoder;
computing a length of a golf club and a lie angle of a golf club head based on the linear measurement and angular measurement; and
displaying, on the image display, an image of the golf club head based on the linear measurement and angular measurement.

2. The apparatus of claim 1, further comprising a network interface that couples the data processor to a data network, and wherein the logic when executed causes the data processor to send the linear measurement and the angular measurement through the data network to a server.

3. The apparatus of claim 1, wherein the logic which when executed by the data processor causes receiving a changed linear measurement from the linear encoder; receiving a changed angular measurement from the angular encoder; and re-displaying, on the image display, an updated image of the golf club head based on the changed linear measurement and changed angular measurement.

4. The apparatus of claim 1, wherein the image of the golf club head is an image of a putter.

5. The apparatus of claim 1, wherein the image of the golf club head is an image of any one of a putter, an iron, a wood, a hybrid club, a wedge, and a metal wood.

6. An apparatus, comprising:
an image display unit;
a linear guide having a lower end that is attached to the image display unit and rotatable in relation to the unit;
an arm that is attached to the linear guide and slidable in relation to the linear guide;
a first encoder coupled to the linear guide and configured to generate a rotation signal when the linear guide is rotated relative to the image display unit;
a second encoder capable of generating a linear measurement signal when the linear guide slides;
image display logic coupled to the first encoder, second encoder, and image display unit and which when executed by one or more processors causes displaying a golf club head image on the image display unit, and re-displaying the image in a changed configuration in response to one or both of the rotation signal and the linear measurement signal.

7. The apparatus of claim 6, wherein the arm comprises a shaft having a golf club grip attached to the shaft.

8. The apparatus of claim 6, wherein the first encoder is an optical rotary encoder.

9. The apparatus of claim 6, wherein the second encoder is an optical linear encoder.

10. The apparatus of claim 6, further comprising data output logic which when executed causes generating an output rotation value and an output linear measurement value that represent a position of the arm.

11. The apparatus of claim 6, further comprising:
data output logic coupled to the first encoder and the second encoder and which when executed causes generating an output rotation value and an output linear measurement value that represent a position of the arm;
golf club fitting logic coupled to the data output logic and which when executed causes reading the output rotation value and the output linear measurement value, determining a length of a shaft of a golf club based on the output linear measurement value, and determining an angle of the golf club shaft relative to the image display unit based on the output rotation value.

12. The apparatus of claim 11, wherein the golf club fitting logic is configured to determine a head weight of a head for the golf club shaft.

13. The apparatus of claim 11, wherein the golf club fitting logic is configured to determine a value of static loft at address for the golf club.

14. The apparatus of claim 6, wherein a shaft having a golf club grip is removably attached to the arm.

15. The apparatus of claim 6, further comprising:
data output logic coupled to the first encoder and the second encoder and which when executed causes generating an output rotation value and an output linear measurement value that represent a position of the arm;
golf club fitting logic coupled to the data output logic and which when executed causes reading the output rotation value and the output linear measurement value, determining a length of a shaft of a golf club based on the output linear measurement value, determining an angle of the golf club shaft relative to the image display unit based on the output rotation value, and communicating the output rotation value and the output linear measurement value over a data network to a data processing system associated with a maker of golf clubs.

16. The apparatus of claim 6, wherein a shaft having a golf club grip is removably attached to the arm, wherein a length encoder is coupled to the shaft, wherein the golf club fitting logic is coupled to the shaft and is configured to determine a length of the shaft based on a signal received from the length encoder.

17. The apparatus of claim 6, further comprising a spring coupled to the linear guide and the image display unit, and positioned to urge the linear guide to rotate to a generally upright position.

18. The apparatus of claim 6, wherein the golf club head image is an image of a head of any one of a putter, an iron, a wood, a hybrid club, a wedge, and a metal wood.

19. An apparatus, comprising:
an image display unit;
a linear guide having a lower end that is attached to the image display unit and rotatable in relation to the unit;
an arm that is attached to the linear guide and slidable in relation to the linear guide, wherein the arm comprises a shaft having a golf club grip attached to the shaft;
a first encoder coupled to the linear guide and configured to generate a rotation signal when the linear guide is rotated relative to the image display unit;
a second encoder capable of generating a linear measurement signal when the linear guide slides;
image display logic coupled to the first encoder, second encoder, and image display unit and which when executed by one or more processors causes displaying a golf club head image on the image display unit, and re-displaying the image in a changed configuration in response to one or both of the rotation signal and the linear measurement signal;
data output logic which when executed causes generating an output rotation value and an output linear measurement value that represent a position of the arm;
golf club fitting logic coupled to the data output logic and which when executed causes reading the output rotation value and the output linear measurement value, determining a length of a shaft of a golf club based on the output linear measurement value, determining an angle value for an angle of the golf club shaft relative to the image display unit based on the output rotation value, and determining a head weight value for a head weight of a head for the golf club shaft;
communicating the output rotation value, the output linear measurement value, the angle, and the head weight value over a data network to a data processing system associated with a maker of golf clubs.

20. The apparatus of claim 19, wherein the golf club head image is an image of a head of any one of a putter, an iron, a wood, a hybrid club, a wedge, and a metal wood.

21. A computer-implemented method of fitting a golf club, comprising:
receiving a rotation value and a linear measurement value from a non-contact optical angular encoder and a non-contact optical linear encoder, respectively, which encoders are coupled to an arm that is rotatable and slidable with respect to a fixed base when the arm is held in a golf position;

creating and storing, based on the linear measurement value, a length value for a length of a golf club;

creating and storing, based on the rotation value, a lie angle value for a lie angle of the golf club.

22. The method of claim 21, further comprising communicating the length value and the lie angle value over a data network to a computer.

23. The method of claim 21, further comprising determining a head weight value for a head weight of a head for the golf club shaft.

24. The method of claim 21, further comprising determining a value of static loft at address for the golf club.

25. The method of claim 21, further comprising displaying, on an image display unit, a golf club head image, determining a position of the golf club head image based on the linear measurement value and the rotation value, and re-displaying the image in a changed configuration in response to receiving changes in any of the linear measurement value and the rotation value.

26. The method of claim 25, wherein the golf club head image is an image of a head of any one of a putter, an iron, a wood, a hybrid club, a wedge, and a metal wood.

27. A method of manufacturing a golf club, comprising:

establishing a data communication session over a network to a golf club fitting apparatus comprising a linear guide having a lower end that is attached to a base and rotatable in relation to the base, an arm that is attached to the linear guide and slidable in relation to the linear guide, a first encoder coupled to the linear guide and configured to generate a rotation signal when the linear guide is rotated relative to the base, and a second encoder configured to generate a linear measurement signal when the linear guide slides;

receiving over the network a length value, representing a length of a golf club, based on the linear measurement signal;

receiving over the network a lie angle value representing a lie angle of the golf club based on the rotation signal;

making a golf club having a shaft having a length equal to the received length value and having a head lie angle equal to the received lie angle value.

28. The method of claim 27, further comprising receiving a head weight value for a head weight of a head for the golf club shaft, and making the golf club with a head having a weight equal to the received head weight value.

29. The method of claim 27, further comprising receiving a static loft value representing a static loft at address of a head of the golf club, and making the golf club with a head having a static loft value equal to the received static loft value.

30. The method of claim 27, wherein the golf club comprises any one of a putter, an iron, a wood, a hybrid club, a wedge, and a metal wood.

31. The method of claim 27, further comprising:

receiving over the network an output rotation value and an output linear measurement value that represent a position of the arm;

determining the length of the shaft of the golf club based on the output linear measurement value; and determining the lie angle of the golf club based on the output rotation value.

32. An apparatus, comprising:

an image display unit;

a golf club shaft apparatus having a lower end that is attached to the image display unit and that is slidable and rotatable in relation to the unit;

image display logic coupled to the golf club shaft apparatus and image display unit and which when executed by one or more processors causes displaying a virtual golf club head image on the image display unit, and re-displaying the image in a changed configuration in response to sliding or rotation of the golf club shaft apparatus.

33. The apparatus of claim 32, further comprising data output logic which when executed causes generating an output rotation value and an output linear measurement value that represent a position of the golf club shaft apparatus.

34. The apparatus of claim 32, further comprising:

data output logic which when executed causes generating an output rotation value and an output linear measurement value that represent a position of the golf club shaft apparatus;

golf club fitting logic coupled to the data output logic and which when executed causes reading the output rotation value and the output linear measurement value, determining a length of a golf club shaft based on the output linear measurement value, and determining an angle of the golf club shaft relative to the image display unit based on the output rotation value.

35. The apparatus of claim 34, wherein the golf club fitting logic is configured to determine a head weight of a head for the golf club shaft.

36. The apparatus of claim 34, wherein the golf club fitting logic is configured to determine a value of static loft at address for the golf club.

37. The apparatus of claim 32, further comprising:

data output logic coupled to the golf club shaft apparatus and which when executed causes generating an output rotation value and an output linear measurement value that represent a position of the golf club shaft apparatus;

golf club fitting logic coupled to the data output logic and which when executed causes reading the output rotation value and the output linear measurement value, determining a length of a shaft of a golf club based on the output linear measurement value, determining an angle of the golf club shaft relative to the image display unit based on the output rotation value, and communicating the output rotation value and the output linear measurement value over a data network to a data processing system associated with a maker of golf clubs.

38. The apparatus of claim 37, wherein the golf club shaft apparatus comprises a shaft having a golf club grip that is removably attached to the arm, a length encoder coupled to the shaft, and wherein the golf club fitting logic is coupled to the shaft and is configured to determine a length of the shaft based on a signal received from the length encoder.

39. The apparatus of claim 32, wherein the golf club head image is an image of a head of any one of a putter, an iron, a wood, a hybrid club, a wedge, and a metal wood.

40. The apparatus of claim 32, wherein the golf club head image comprises a first image of a virtual head of any one of a putter, an iron, a wood, a hybrid club, a wedge, and a metal wood, and comprises a second image of a virtual golf ball.

* * * * *